United States Patent
Takai et al.

(10) Patent No.: US 11,173,516 B2
(45) Date of Patent: Nov. 16, 2021

(54) ANTIGLARE FILM-COATED SUBSTRATE, METHOD FOR ITS PRODUCTION, AND ARTICLE

(71) Applicant: AGC Inc., Chiyoda-ku (JP)

(72) Inventors: Azusa Takai, Chiyoda-ku (JP); Shuji Taneda, Chiyoda-ku (JP); Satoshi Mototani, Chiyoda-ku (JP); Yoshimi Otani, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 388 days.

(21) Appl. No.: 15/288,425

(22) Filed: Oct. 7, 2016

(65) Prior Publication Data

US 2017/0021383 A1 Jan. 26, 2017

Related U.S. Application Data

(63) Continuation of application No. PCT/JP2015/065802, filed on Jun. 1, 2015.

(30) Foreign Application Priority Data

Jun. 2, 2014 (JP) .............................. JP2014-114399

(51) Int. Cl.
*B05D 1/04* (2006.01)
*C03C 17/00* (2006.01)
(Continued)

(52) U.S. Cl.
CPC .................. *B05D 1/04* (2013.01); *B05B 5/04* (2013.01); *B05B 5/0426* (2013.01); *B05B 15/58* (2018.02);
(Continued)

(58) Field of Classification Search
CPC .................................. G02B 1/11; C03C 17/02
See application file for complete search history.

(56) References Cited

U.S. PATENT DOCUMENTS 4,589,597 A * 5/1986 Robisch ................ B05B 3/1064
239/224
5,150,004 A * 9/1992 Tong ........................ H01J 9/20
313/478
(Continued)

FOREIGN PATENT DOCUMENTS

JP 2007078817 A * 3/2007
JP 2009-58640 3/2009
(Continued)

OTHER PUBLICATIONS

Machine translation of JP2007078817A, no date.*
International Search Report dated Sep. 8, 2015 in PCT/JP2015/065802, filed on Jun. 1, 2015.

*Primary Examiner* — Alex A Rolland
(74) *Attorney, Agent, or Firm* — Oblon, McClelland, Maier & Neustadt, L.L.P.

(57) ABSTRACT

To provide a production method capable of producing an antiglare film-coated substrate having excellent antiglare performance in a short time, an antiglare film-coated substrate having excellent antiglare performance, and an article provided with the substrate. A method for producing an antiglare film-coated substrate 1 comprising a substrate 3 and an antiglare film 5 formed on the substrate 3, characterized by comprising a step of preparing a coating composition comprising at least one of a silica precursor (A) and particles (C), and a liquid medium (B), wherein the liquid medium (B) contains a liquid medium (B1) having a boiling point of at most 150° C. in an amount of at least 86 mass % based on the total amount of the liquid medium (B), a step of electrically charging and spraying the coating composition by using an electrostatic coating apparatus having an (Continued)

electrostatic coating gun having a rotary atomizing head, to apply it on the substrate 3 to form a coating film, and a step of firing the coating film to form an antiglare film 5.

12 Claims, 3 Drawing Sheets

(51) Int. Cl.
| | |
|---|---|
| *B05B 15/58* | (2018.01) |
| *B05B 5/04* | (2006.01) |
| *B05D 5/06* | (2006.01) |
| *B05D 7/24* | (2006.01) |
| *G02B 5/02* | (2006.01) |
| *B05B 14/40* | (2018.01) |
| *B05D 1/02* | (2006.01) |
| *B05B 5/08* | (2006.01) |
| *B05B 3/10* | (2006.01) |

(52) U.S. Cl.
CPC ............... *B05D 5/06* (2013.01); *B05D 7/24* (2013.01); *C03C 17/007* (2013.01); *G02B 5/02* (2013.01); *B05B 3/1064* (2013.01); *B05B 5/0411* (2013.01); *B05B 5/084* (2013.01); *B05B 14/40* (2018.02); *B05D 1/02* (2013.01); *B05D 2203/35* (2013.01); *B05D 2252/00* (2013.01); *B05D 2401/10* (2013.01); *B05D 2601/22* (2013.01); *C03C 2217/478* (2013.01); *C03C 2218/115* (2013.01)

(56) References Cited

U.S. PATENT DOCUMENTS

| | | | |
|---|---|---|---|
| 2002/0014090 A1* | 2/2002 | Tsujino | C03C 17/42 65/17.2 |
| 2005/0255320 A1 | 11/2005 | Noguchi | |
| 2006/0046071 A1* | 3/2006 | Richter | B82Y 30/00 428/432 |
| 2012/0208029 A1* | 8/2012 | Lin | C09D 183/08 428/413 |
| 2014/0329022 A1 | 11/2014 | Otani et al. | |

FOREIGN PATENT DOCUMENTS

| | | |
|---|---|---|
| JP | 2013-047177 A | 3/2013 |
| WO | WO 2004/085493 A1 | 10/2004 |
| WO | WO 2013/065801 A1 | 5/2013 |

\* cited by examiner

ND GLARE FILM-COATED SUBSTRATE, METHOD FOR ITS PRODUCTION, AND ARTICLE

TECHNICAL FIELD

The present invention relates to an antiglare film-coated substrate and a method for its production, as well as an article provided with the antiglare film-coated substrate.

BACKGROUND ART

In an image display (such as a liquid crystal display, an organic EL display, a plasma display, etc.) provided on various devices (such as televisions, personal computers, smart phones, mobile phones, etc.), if external light such as room lighting (fluorescent light, etc.) or solar light is reflected on the display surface, visibility is reduced by the reflected image.

As a method for suppressing the reflection of external light, there is a method of disposing an antiglare film having surface irregularities, on the display surface of the image display device, to diffusely reflect external light thereby to blur the reflected image.

As a method for forming the antiglare film, a method of applying a coating solution containing a silica precursor such as a hydrolyzed condensate of an alkoxysilane onto a substrate by a spray method, followed by firing, is known (see e.g. Patent Document 1). In a case where the antiglare film is formed by a spray method, a two-fluid spray nozzle is used in many cases.

However, in the case of applying the coating solution by using a two-fluid spray nozzle, the spraying width is narrow, and therefore, nozzle scanning by reciprocating the spray head on the substrate becomes necessary. Further, in order to obtain an antiglare film having high antiglare performance, it is necessary to repeat coating many times. Therefore, the time required for application of the coating solution becomes longer.

On the other hand, Patent Document 2 proposes a method for forming a low-reflection film by applying a specific coating composition on a substrate by using an electrostatic coating method, followed by firing or drying. According to this method, it is said to be possible to solve problems of a conventional spray coating method (for example, a problem such that because it is necessary to reciprocate the spray head in the width direction of the substrate, it is necessary to slow down the transport speed of the substrate in order to form a low reflective film uniformly on the wide substrate width, a problem such that since there is a substantial amount of the low-reflection film-forming coating composition scattered into the atmosphere without deposition on the substrate, the amount of the low-reflection film-forming coating composition required tends to be large, etc.).

However, in Patent Document 2, there is no description about an antiglare film. Even if a film is formed on a substrate in accordance with the procedure disclosed in Examples in Patent Document 2, although the film has excellent low reflection performance as a low-reflection film, it does not have anti-glare performance required for an antiglare film.

PRIOR ART DOCUMENTS

Patent Documents

Patent Document 1: JP-A-2009-058640
Patent Document 2: WO2013/065801

DISCLOSURE OF INVENTION

Technical Problem

The present invention has an object to provide a production method capable of producing an antiglare film-coated substrate having excellent antiglare performance in a short time, an antiglare film-coated substrate having excellent antiglare performance, and an article provided with the same.

Solution to Problem

The present invention provides the following.
[1] A method for producing an antiglare film-coated substrate comprising a substrate and an antiglare film formed on said substrate, characterized by comprising
a step of preparing a coating composition comprising at least one of a silica precursor (A) and particles (C), and a liquid medium (B), wherein the liquid medium (B) contains a liquid medium (B1) having a boiling point of at most 150° C. in an amount of at least 86 mass % based on the total amount of the liquid medium (B),
a step of electrically charging and spraying the coating composition by using an electrostatic coating apparatus having an electrostatic spray gun having a rotary atomizing head, to apply it on the substrate to form a coating film, and
a step of firing the coating film to form an antiglare film.
[2] The method for producing an antiglare film-coated substrate according to [1], wherein the rotational speed of the rotary atomizing head at the time of applying the coating composition is from 5000 to 80000 rpm.
[3] The method for producing an antiglare film-coated substrate according to [1] or [2], wherein at the time of applying the coating composition, shaving air is blown under an air pressure of from 0.01 to 0.3 MPa from the electrostatic spray gun.
[4] The method for producing an antiglare film-coated substrate according to any one of [1] to [3], wherein the total content of the silica precursor (A) and the particles (C) in the coating composition is from 30 to 100 mass % in the solid content (100 mass %) in the coating composition (provided that the silica precursor (A) is calculated as $SiO_2$).
[5] The method for producing an antiglare film-coated substrate according to any one of [1] to [4], wherein the content of the silica precursor (A) in the coating composition (A) is from 35 to 95 mass % in the solid content (100 mass %) in the coating composition (provided that the silica precursor (A) is calculated as $SiO_2$).
[6] The method for producing an antiglare film-coated substrate according to any one of [1] to [5], wherein the content of the particles (C) in the coating composition is from 3 to 40 mass % in the solid content (100 mass %) in the coating composition (provided that the silica precursor (A) is calculated as $SiO_2$).
[7] The method for producing an antiglare film-coated substrate according to any one of [1] to [6], wherein the content of the liquid medium (B) in the coating composition is such an amount that the solid content concentration of the coating composition becomes from 1 to 8 mass % in the entire amount (100 mass %) of the coating composition.
[8] An antiglare film-coated substrate obtainable by the method for producing an antiglare film-coated substrate as defined in any one of [1] to [7].
[9] An article provided with an antiglare film-coated substrate as defined in [8].
[10] The article according to [9], which is an image display device.

Advantageous Effects of Invention

According to the present invention, it is possible to provide a production method capable of producing an antiglare film-coated substrate having excellent antiglare performance in a short time, an antiglare film-coated substrate having excellent antiglare performance, and an article provided with the same.

DESCRIPTION OF EMBODIMENTS

The following definitions of terms shall apply throughout this specification including Claims.

A "silica precursor" is meant for a substance capable of forming a matrix comprising silica as the main component by firing.

The term "comprising silica as the main component" is meant to contain $SiO_2$ in an amount of at least 90 mass %.

A "hydrolyzable group bonded to a silicon atom" means a group that can be converted by hydrolysis to a OH group bonded to the silicon atom.

The term "scaly particles" is meant for particles having a flat shape. The shape of the particles can be confirmed by means of a transmission electron microscope (hereinafter referred to also as TEM).

The "60° specular gloss" is measured by the method described in JIS Z8741: 1997 (ISO2813 1994), without erasing the reflection at the back surface (the surface opposite to the side where the antiglare film is formed).

The "haze" is measured by the method described in JIS K7136: 2000 (ISO14782: 1999).

The "arithmetic average roughness Ra" is measured by the method described in JIS B0601: 2001 (ISO4287: 1997).

An "average particle size" means a particle diameter at the point of 50% in a cumulative volume distribution curve wherein the total volume of the particle size distribution obtained by volume is 100%, i.e. a volume cumulative 50% diameter (D50). The particle size distribution is obtained by the frequency distribution and cumulative volume distribution curve measured by a laser diffraction/scattering type particle size distribution measuring apparatus.

An "aspect ratio" means a ratio of the maximum length to the thickness (maximum length/thickness) of a particle, and an "average aspect ratio" is an average value of the aspect ratios of 50 particles selected randomly. The thickness of a particle is measured by an atomic force microscope (hereinafter referred to also as AFM), and the maximum length is measured by TEM.

<Antiglare Film-Coated Substrate>

An antiglare film-coated substrate obtainable by the method for producing an antiglare film-coated substrate of the present invention, comprises a substrate and an antiglare film formed on the substrate.

The haze of the antiglare film-coated substrate is preferably at least 5%, more preferably from 8 to 50%, further preferably from 10 to 35%. When the haze is at least 5%, an antiglare effect is sufficiently exhibited. When the haze is at most 50%, in the case of providing the antiglare film-coated substrate as a protective plate or various filter on the viewing side of an image display apparatus main body, reduction in contrast of the image can be sufficiently suppressed.

Figure 1:
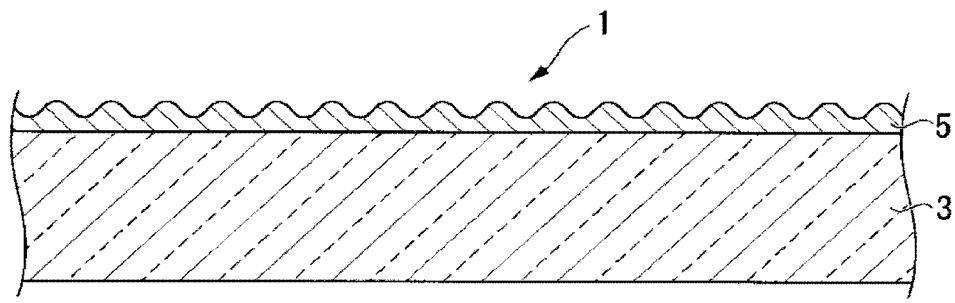
FIG. 1 is a schematic cross-sectional view of an example of the antiglare film-coated substrate in the present invention.

FIG. 1 is a schematic cross-sectional view showing an example of the antiglare film-coated substrate obtainable by the production method of the present invention.

The antiglare film-coated substrate 1 of this example comprises a substrate 3 and an antiglare film 5 formed on the substrate 3.

(Substrate)

The material for the substrate 3 may, for example, be glass, a metal, a resin, silicon, wood, paper, etc.

As the glass, soda lime glass, borosilicate glass, aluminosilicate glass, alkali-free glass, etc. may be mentioned. Aluminosilicate glass is preferred, since a large stress is likely to be exerted depending upon tempering treatment even if the thickness is thin, and it is suitable as an article that is disposed on the viewing side of an image display device. For the same reason, chemically tempered glass is preferred, and chemically tempered aluminosilicate glass is particularly preferred.

The resin may, for example, be polyethylene terephthalate, polycarbonate, triacetyl cellulose, polymethyl methacrylate, etc.

The form of the substrate 3 may, for example, be plate, film, etc.

The shape of the substrate 3 is usually a flat shape. Recently, however, in various devices (e.g., televisions, personal computers, smart phones, car navigation systems, etc.), there have been cases wherein the display surface of an image display device is a curved surface, and the substrate may have a shape with a curved surface to meet the shape of the image display device.

The substrate 3 may be one having a functional layer on the surface of the substrate main body.

As such a functional layer, an undercoat layer, an adhesion improving layer, a protective layer, etc. may be mentioned.

The undercoat layer has a function as an alkali-barrier layer or a low refractive index layer with a wide band. As the undercoat layer, preferred is a layer formed by applying an undercoat coating composition comprising an alkoxysilane hydrolyzate (sol-gel silica) to the substrate main body.

(Antiglare Film)

The antiglare film 5 is one obtained by firing a coating film of a coating composition comprising at least one of a silica precursor (A) and particles (C), and a liquid medium (B), which may, as the case requires, contain other components other than the silica precursor (A) and particles (C). In a case where the coating composition contains the silica precursor (A), the matrix of the antiglare film 5 contains a matrix comprising silica as the main component, derived from the silica precursor (A). The antiglare film 5 may be composed of the particles (C). The antiglare film 5 may be one having the particles (C) dispersed in the above matrix.

The coating composition contains, as the liquid medium (B), a liquid medium (B1) having a boiling point of at most 150° C. Further, the content of the liquid medium (B1) is at least 86 mass % based on the total amount of the liquid medium (B).

The 60° specular gloss at the surface of the antiglare film 5 is preferably at most 120%, more preferably at most 100%, further preferably at most 80%. The 60° specular gloss at the surface of the antiglare film 5 is an index for the antiglare effect, and when the 60° specular gloss is at most 120%, the antiglare effect is sufficiently exhibited.

The arithmetic average roughness Ra of the surface of the antiglare film 5 is preferably at least 0.05 μm, more preferably from 0.10 to 0.70 μm, further preferably from 0.15 to 0.50 μm. When the arithmetic average roughness Ra of the surface of the antiglare film 5 is at least 0.05 μm, the antiglare effect is sufficiently exhibited. When the arithmetic average roughness Ra of the surface of the antiglare film 5 is at most the upper limit of 0.70 μm in the above range, a decrease in contrast of the image is sufficiently suppressed.

The maximum height roughness Rz of the surface of the antiglare film 5 is preferably from 0.2 to 5.0 μm, more preferably from 0.3 to 4.5 μm, further preferably from 0.5 to 4.0 μm. When the maximum height roughness Rz of the surface of the antiglare film 5 is at least the lower limit value in the above range, the antiglare effect is sufficiently exhibited. When the maximum height roughness Rz of the surface of the antiglare film 5 is at most the upper limit value in the above range, a decrease in contrast of the image is sufficiently suppressed.

<Method for Producing Antiglare Film-Coated Substrate>

The method for producing an antiglare film-coated substrate of the present invention, comprises a step of preparing a coating composition comprising at least one of a silica precursor (A) and particles (C), and a liquid medium (B), wherein the liquid medium (B) contains a liquid medium (B1) having a boiling point of at most 150° C. in an amount of at least 86 mass % based on the total amount of the liquid medium (B) (hereafter referred to also as the coating composition preparation step), a step of electrically charging and spraying the above coating composition by using an electrostatic coating apparatus having an electrostatic spray gun having a rotary atomizing head, to apply it on the above substrate to form a coating film (hereinafter referred to also as the coating step), and a step of firing the coating film to form an antiglare film (hereinafter referred to also as the firing step). As the case requires, it may have a step of forming a functional layer on the surface of the substrate main body before forming the antiglare film, or a step of applying a known post processing after forming the antiglare film.

[Coating Composition Preparation Step]

The coating composition comprises at least one of a silica precursor (A) and particles (C), and a liquid medium (B).

In a case where the coating composition does not contain a silica precursor (A) and contains particles (C), the average particle size of the particles (C) is preferably at most 30 nm.

The coating composition may contain other binders (D), other additives (E), etc., other than the silica precursor (A), as the case requires.

(Silica Precursor (A))

The silica precursor (A) may, for example, be a silane compound (A1) having a hydrocarbon group and a hydrolyzable group bonded to silicon atom(s), or its hydrolyzed condensate, an alkoxysilane (provided that the silane compound (A1) is excluded) or its hydrolyzed condensate (sol-gel silica), silazane, etc.

In the silane compound (A1), the hydrocarbon group bonded to silicon atom(s) may be a monovalent hydrocarbon group bonded to one silicon atom, or may be a divalent hydrocarbon group bonded to two silicon atoms. The monovalent hydrocarbon group may, for example, be an alkyl group, an alkenyl group, an aryl group, etc. The divalent hydrocarbon group may, for example, be an alkylene group, an alkenylene group, an arylene group, etc.

The hydrocarbon group may have a group having one or more selected from —O—, —S—, —CO— and —NR'— (provided that R' is a hydrogen atom or a monovalent hydrocarbon group) combined between carbon atoms.

The hydrolyzable group bonded to a silicon atom may, for example, be an alkoxy group, an acyloxy group, a ketoxime group, an alkenyloxy group, an amino group, an aminoxy group, an amide group, an isocyanate group, a halogen atom, etc. Among them, from the viewpoint of the balance between the stability and the hydrolyzability of the silane compound (A1), an alkoxy group, an isocyanate group or a halogen atom (especially chlorine atom) is preferred.

As the alkoxy group, an alkoxy group having from 1 to 3 carbon atoms is preferred, and a methoxy group or an ethoxy group is more preferred.

When a plurality of hydrolyzable groups are present in the silane compound (A1), such hydrolyzable groups may be the same groups or may be different groups, and from the viewpoint of availability, they are preferably the same groups.

The silane compound (A1) may, for example, be a compound represented by the formula (I) as described later, an alkoxysilane having an alkyl group (methyl trimethoxysilane, ethyl triethoxysilane, etc.), an alkoxysilane having a vinyl group (vinyl trimethoxysilane, vinyl triethoxysilane, etc.), an alkoxysilane having an epoxy group (2-(3,4-epoxycyclohexyl)ethyl trimethoxysilane, 3-glycidoxypropyltrimethoxysilane, 3-glycidoxypropylmethyldiethoxysilane, 3-glycidoxypropyltriethoxysilane, etc.), an alkoxysilane having an acryloyloxy group (3-acryloyloxypropyltrimethoxysilane, etc.), etc.

As the silane compound (A1), a compound represented by the following formula (I) is preferred, from such a viewpoint that cracking or peeling of the antiglare film is unlikely to occur even when the film thickness is thick.

$$R_{3-p}L_pSi\text{-}Q\text{-}SiL_pR_{3-p} \quad (I)$$

In the formula (I), Q is a divalent hydrocarbon group (which may have, between carbon atoms, a group having one or more selected from —O—, —S—, —CO— and —NR'— (wherein R' is a hydrogen atom or a monovalent hydrocarbon group) combined). The divalent hydrocarbon may be one as mentioned above.

Q is preferably an alkylene group having from 2 to 8 carbon atoms, more preferably an alkylene group having from 2 to 6 carbon atoms, from the viewpoint of easy availability and since cracking or peeling of the antiglare film is unlikely to occur even if the film thickness is thick.

In the formula (I), L is a hydrolyzable group. The hydrolyzable group may be one as mentioned above, and its preferred embodiment is also the same.

R is a hydrogen atom or a monovalent hydrocarbon group. The monovalent hydrocarbon may be one as mentioned above.

p is an integer of from 1 to 3. p is preferably 2 or 3, particularly preferably 3, from such a viewpoint that the reaction rate will not thereby be too slow.

The alkoxysilane (excluding the silane compound (A1)) may, for example, be a tetraalkoxysilane (tetramethoxysilane, tetraethoxysilane, tetrapropoxysilane, tetrabutoxysilane, etc.), an alkoxysilane having a perfluoropolyether group (perfluoropolyether triethoxysilane, etc.), an alkoxysilane having a perfluoroalkyl group (perfluoroethyl triethoxysilane, etc.), etc.

Hydrolysis and condensation of the silane compound (A1) and the alkoxysilane (excluding the silane compound (A1)) can be carried out by a known method.

For example, in the case of a tetraalkoxysilane, the hydrolysis and condensation may be carried out by using water in an amount of at least 4 times by mol of the tetraalkoxysilane, and an acid or alkali as a catalyst.

The acid may be an inorganic acid ($HNO_3$, $H_2SO_4$, HCl, etc.) or an organic acid (formic acid, oxalic acid, monochloroacetic acid, dichloroacetic acid, trichloroacetic acid, etc.). The alkali may, for example, be ammonia, sodium hydroxide, potassium hydroxide, etc. As the catalyst, an acid is preferred, from the viewpoint of a long-term storage of the hydrolyzed condensate of the silane compound (A).

As the silica precursor (A), one type may be used alone, or two or more types may be used in combination.

The silica precursor (A) preferably contains either one or both of the silane compound (A1) and its hydrolyzed condensate, with a view to preventing cracking or peeling of the antiglare film.

The silica precursor (A) preferably contains either one or both of the tetraalkoxysilane and its hydrolyzed condensate, from the viewpoint of abrasion strength of the antiglare film.

The silica precursor (A) particularly preferably contains either one or both of the silane compound (A1) and its hydrolyzed condensate, and either one or both of the tetraalkoxysilane and its hydrolyzed condensate.

(Liquid Medium (B))

When the coating composition contains the silica precursor (A), the liquid medium (B) is one to dissolve or disperse the silica precursor (A), and when the coating composition contains the particles (C), it is one to disperse the particles (C). When the coating composition contains both the silica precursor (A) and the particles (C), the liquid medium (B) may be one having both of the function as a solvent or dispersion medium for dissolving or dispersing the silica precursor (A), and the function as a dispersion medium for dispersing the particles (C).

The liquid medium (B) contains at least a liquid medium (B1) having a boiling point of at most 150° C. The boiling point of the liquid medium (B1) is preferably from 50 to 145° C., more preferably from 55 to 140° C.

When the boiling point of the liquid medium (B1) is at most 150° C., a film obtainable by applying the coating composition on a substrate by using an electrostatic painting apparatus having an electrostatic spray gun having a rotary atomizing head, followed by firing, will have more preferable antiglare performance. When the boiling point of the liquid medium (B1) is at least the lower limit value in the above range, it is possible to form the surface irregularities while sufficiently maintaining the shape of droplets of the coating composition after the droplets are deposited on the substrate.

The liquid medium (B1) may, for example, be water, an alcohol (methanol, ethanol, isopropyl alcohol, n-butyl alcohol, isobutyl alcohol, 1-pentanol, etc.), a ketone (acetone, methyl ethyl ketone, methyl isobutyl ketone, etc.), an ether (tetrahydrofuran, 1,4-dioxane, etc.), a cellosolve (methyl cellosolve, ethyl cellosolve, etc.), an ester (methyl acetate, ethyl acetate, etc.), a glycol ether (ethylene glycol monomethyl ether, ethylene glycol monoethyl ether, etc.), etc.

As the liquid medium (B1), one type may be used alone, or two or more types may be used in combination.

The liquid medium (B) may further contain another liquid medium other than the liquid medium (B1), i.e. a liquid medium having a boiling point exceeding 150° C. The content of such a liquid medium having a boiling point exceeding 150° C. is less than 14 mass % based on the total amount of the liquid medium (B).

Such another liquid medium may, for example, be an alcohol, a ketone, an ether, a cellosolve, an ester, a glycol ether, a nitrogen-containing compound, a sulfur-containing compound, etc.

The alcohol may, for example, be diacetone alcohol, 1-hexanol, ethylene glycol, etc.

The nitrogen-containing compound may, for example, be N,N-dimethylacetamide, N,N-dimethylformamide, N-methylpyrrolidone, etc.

The glycol ether may, for example, be ethylene glycol monobutyl ether, etc.

The sulfur-containing compound may, for example, be dimethyl sulfoxide, etc.

As another liquid medium, one type may be used alone, or two or more types may be used in combination.

Since water is required for hydrolysis of e.g. an alkoxysilane in the silica precursor (A), the liquid medium (B) contains at least water as the liquid medium (B1), unless replacement of the liquid medium is conducted after the hydrolysis.

In such a case, the liquid medium (B) may solely be water, or may be a mixture of water and other liquid. Other liquid may be the liquid medium (B1) other than water, or may be another liquid medium, for example, an alcohol, a ketone, an ether, a cellosolve, an ester, a glycol ether, a nitrogen-containing compound, a sulfur-containing compound, etc. Among them, as the solvent for the silica precursor (A), an alcohol is preferred, and methanol, ethanol, isopropyl alcohol or butanol is particularly preferred.

(Particles (C))

The particles (C), alone or together with a matrix derived from the silica precursor (A), constitute the antiglare film.

In a case where the coating composition does not contain the silica precursor and contains the particles (C), the average particle size of the particles (C) is preferably at most 30 nm.

The particles (C) may be scaly particles (C1) or other particles (C2) other than the scaly particles (C1), etc.

Scaly Particles (C1):

The average aspect ratio of the scaly particles (C1) is preferably from 50 to 650, more preferably from 100 to 350, further preferably from 170 to 240. When the average aspect ratio of the scaly particle (C1) is at least 50, cracking or peeling of the antiglare film can be sufficiently suppressed even when the film thickness is thick. When the average aspect ratio of the scaly particles (C1) is at most 650, the dispersion stability in the coating composition will be good.

The average particle size of the scaly particles (C1) is preferably from 0.08 to 0.42 µm, more preferably from 0.17 to 0.21 µm. When the average particle size of the scaly particles (C1) is at least 0.08 µm, cracking or peeling of the antiglare film can be sufficiently suppressed even if the film thickness is thick. When the average particle size of the scaly particles (C1) is at most 0.42 µm, the dispersion stability in the coating composition will be good.

The scaly particles (C1) may, for example, be scaly silica particles, scaly alumina particles, scaly titania, scaly zirconia, etc., and scaly silica particles are preferred from such a viewpoint that it is thereby possible to suppress an increase in the refractive index of the film and to reduce the reflectance.

Scaly silica particles are scaly silica primary particles, or silica secondary particles formed by a plurality of scaly silica primary particles which are overlapped one another so that their faces are oriented to be parallel with one another. The silica secondary particles usually have a particle morphology of a layered structure.

The scaly silica particles may be composed solely of either one of the silica primary particles and the silica secondary particles, or may be composed of both of them.

The thickness of the silica primary particles is preferably from 0.001 to 0.1 μm. When the thickness of the silica primary particles is within the above range, they can form scaly silica secondary particles having one or a plurality of them overlapped with their faces oriented in parallel to one another.

The ratio of the minimum length to the thickness of the silica primary particles (minimum length/thickness) is preferably at least 2, more preferably at least 5, further preferably at least 10.

The thickness of the silica secondary particles is preferably from 0.001 to 3 μm, more preferably from 0.005 to 2 μm.

The ratio of the minimum length to the thickness of the silica secondary particles is preferably at least 2, more preferably at least 5, further preferably at least 10.

The silica secondary particles are preferably present independently of one another without being fused to one another.

The $SiO_2$ purity of the scaly silica particles is preferably at least 95.0 mass %, more preferably at least 99.0 mass %.

In the preparation of the coating composition, a powder as an assembly of a plurality of scaly silica particles, or a dispersion having the powder dispersed in a liquid medium, is used. The silica concentration in the dispersion is preferably from 1 to 80 mass %.

In the powder or dispersion, amorphous silica particles formed during the production of scaly silica particles may sometimes be contained in addition to scaly silica particles. Scaly silica particles may be obtained, for example, by pulverizing and dispersing aggregated silica tertiary particles (hereinafter referred to also as silica aggregates) having spaces formed by scaly silica particles which are overlapped and irregularly agglomerated one another. Amorphous silica particles are silica aggregates in a state of being pulverized to some extent but not sufficiently pulverized to individual scaly silica particles, and in a state where a plurality of scaly silica particles form lumps. If amorphous silica particles are contained, the denseness of the antiglare film to be formed, may be lowered, and cracking or peeling of the film is likely to occur. Therefore, the content of amorphous silica particles in the powder or dispersion should better be less.

Amorphous silica particles and silica aggregates are respectively observed as being black in the TEM observation. On the other hand, scaly silica primary particles or silica secondary particles are observed as being transparent or semitransparent by the TEM observation.

As scaly silica particles, commercial products may be used, or those produced may be used.

Scaly silica particles are preferably those produced by the production method (P) as described later. According to the production method (P), as compared with a known production method (such as a method described in Japanese Patent No. 4,063,464), it is possible to suppress formation of amorphous silica particles in the production process, and it is possible to obtain a powder or dispersion having a less content of amorphous silica particles.

Particles (C2):

Other particles (C2) other than the scaly particles (C1) may, for example, be metal oxide particles, metal particles, pigment particles, resin particles, etc.

The material for the metal oxide particles may, for example, be $Al_2O_3$, $SiO_2$, $SnO_2$, $TiO_2$, $ZrO_2$, ZnO, $CeO_2$, Sb-containing $SnO_x$ (ATO), Sn-containing $In_2O_3$ (ITO), $RuO_2$, etc. As the material for the metal oxide particles, since the matrix in the antiglare film of the present invention is silica, $SiO_2$ having the same refractive index as the matrix is preferred.

The material for the metal particles may be a metal (Ag, Ru, etc.) or an alloy (AgPd, RuAu, etc.).

The pigment particles may be inorganic pigments (titanium black, carbon black, etc.) or organic pigments.

The material for the resin particles may, for example, be an acrylic resin, a polystyrene, a melanin resin, etc.

The shape of the particles (C2) may, for example, be spherical, ellipsoidal, acicular, plate-like, rod-like, conical, cylindrical, cubic, cuboid-shaped, diamond-like, star-like, irregular shape, etc. Other particles may be present in a state in which the respective particles are independent, the respective particles are linked in a chain, or the respective particles may be aggregated.

Particles (C2) may be solid particles, may be hollow particles, or may be perforated particles such as porous particles.

The particles (C2) are preferably silica particles (but excluding scaly silica particles), such as spherical silica particles, rod-like silica particles, acicular silica particles, etc. Among them, spherical silica particles are preferred, and porous spherical silica particles are more preferred, since the haze of the antiglare film-coated substrate thereby becomes sufficiently high, and the 60° specular gloss at the surface of the antiglare film becomes sufficiently low, and as a result, the antiglare effect is sufficiently exhibited.

The average particle size of the particles (C2) is preferably from 0.3 to 2 μm, more preferably from 0.5 to 1.5 μm. When the average particle size of the particles (C2) is at least 0.3 μm, the anti-glare effect will be sufficiently exhibited. When the average particle size of the particles (C2) is at most 2 μm, the dispersion stability in the coating composition will be good.

The BET specific surface area of the porous spherical silica particles is preferably from 200 to 300 $m^2/g$.

The pore volume of the porous spherical silica particles is preferably from 0.5 to 1.5 $cm^3/g$.

As commercial products of porous spherical silica particles, Light Star (registered trademark) series, manufactured by Nissan Chemical Industries, Ltd. may be mentioned.

As the particles (C), one type may be used alone, or two or more types may be used in combination.

The particles (C) preferably contain scaly particles (C1) and may further contain particles (C2). By incorporating scaly particles (C1), the haze of the antiglare film becomes high, whereby better antiglare performance can be obtained. Further, as compared with particles (C2), in a case where scaly particles (C1) are incorporated, cracking or peeling tends to be less likely to occur when the thickness of the antiglare film is made thick.

(Binder (D))

The binder (D) (excluding the silica precursor (A)) may, for example, be an inorganic material, a resin or the like to be dissolved or dispersed in the liquid medium (B).

The inorganic material may, for example, be a metal oxide precursor other than silica (metal: titanium, zirconium, etc.), etc.

The resin may, for example, be a thermoplastic resin, a thermosetting resin, an ultraviolet curable resin, etc.

(Additives (E))

The coating composition may further contain additives (E), as the case requires, in a range not to impair the effects of the present invention.

The additives (E) may, for example, be an organic compound (E1) having a polar group, an ultraviolet absorber, an infrared reflecting agent, an infrared absorbing agent, an antireflection agent, a surfactant to improve leveling properties, a metal compound to improve the durability, etc.

In a case where the coating composition contains particles (C), by incorporating the organic compound (E1) having a polar group in the coating composition, it is possible to suppress aggregation of particles (C) due to an electrostatic force in the coating composition.

From the viewpoint of the effect to suppress aggregation of particles (C), the organic compound (E1) having a polar group is preferably one having a hydroxy group and/or carbonyl group in the molecule, more preferably one having at least one member selected from the group consisting of a hydroxy group, an aldehyde group (—CHO), a keto group (—C(=O)—), an ester bond (—C(=O)O—) and a carboxy group (—COOH) in the molecule, further preferably one having at least one member selected from the group consisting of a carboxy group, a hydroxyl group, an aldehyde group and a keto group.

The organic compound (E1) having a polar group may, for example, be an unsaturated carboxylic acid polymer, a cellulose derivative, an organic acid (but excluding an unsaturated carboxylic acid polymer), a terpene compound, etc. As the organic compound (E1), one type may be used alone, or two or more types may be used in combination.

The unsaturated carboxylic acid polymer may, for example, be polyacrylic acid.

The cellulose derivative may, for example, be poly hydroxyalkyl cellulose.

The organic acid (but excluding an unsaturated carboxylic acid polymer) may, for example, be formic acid, oxalic acid, monochloroacetic acid, dichloroacetic acid, trichloroacetic acid, citric acid, tartaric acid, maleic acid, etc.

In a case where an organic acid is a catalyst for the hydrolysis of e.g. an alkoxysilane, such an organic acid is also included in the organic acid as the organic compound (E1).

A terpene means a hydrocarbon with a composition of $(C_5H_8)_n$ (where n is an integer of at least 1) having isoprene $(C_5H_8)$ as a structural unit. The terpene compound means a terpene having a functional group derived from a terpene. Terpene compounds include those differing in degree of unsaturation.

Although the terpene compound includes one which may function also as a liquid medium, but the "hydrocarbon with a composition of $(C_5H_8)_n$ having isoprene as a structural unit" shall be regarded as corresponding to a terpene derivative and shall not be regarded as one corresponding to a liquid medium.

The terpene derivative may, for example, be a terpene alcohol (α-terpineol, terpinene 4-ol, L-menthol, (±) citronellol, mill tenor, borneol, nerol, farnesol, phytol, etc.), a terpene aldehyde (citral, β-cyclocitral, perilla aldehyde, etc.), a terpene ketone ((±) cerebellum, β-ionone, etc.), a terpene carboxylic acid (citronellic acid, abietic acid, etc.), a terpene ester (terpinyl acetate, menthyl acetate, etc.), etc.

The surfactant to improve leveling properties may, for example, be a silicone oil-type, an acrylic type, etc.

The metal compound to improve the durability may preferably be a zirconium chelate compound, a titanium chelate compound, an aluminum chelate compound, etc. The zirconium chelate compound may, for example, be zirconium tetraacetyl acetonate, zirconium tributoxy stearate, etc.

(Composition)

The total content of the silica precursor (A) and the particles (C) in the coating composition is preferably from 30 to 100 mass %, more preferably from 40 to 100 mass % in the solid content (100 mass %) in the coating composition (provided that the silica precursor (A) is calculated as $SiO_2$). When the total content of the silica precursor (A) and the particles (C) is at least the lower limit value in the above range, the antiglare film will be excellent in adhesion to a substrate. When the total content of the silica precursor (A) and the particles (C) is at most the upper limit value in the above range, cracking or peeling of the antiglare film can be suppressed.

In a case where the coating composition contains the silica precursor (A), the content of the silica precursor (A) (calculated as $SiO_2$) in the coating composition is preferably from 35 to 95 mass %, more preferably from 50 to 90 mass % in the solid content (100 mass %) in the coating composition (provided that the silica precursor (A) is calculated as $SiO_2$). When the content of the silica precursor (A) is at least the lower limit value in the above range, sufficient adhesion strength of the antiglare film to the substrate is obtainable. When the content of the silica precursor (A) is at most the upper limit value in the above range, cracking or peeling of the antiglare film can be sufficiently suppressed even if the film thickness is thick.

In a case where the coating composition contains the silica precursor (A) and the silica precursor (A) contains either one or both of the silane compound (A1) and its hydrolyzed condensate, the proportion of the silane compound (A1) and its hydrolyzed condensate in the silica precursor (A) is preferably from 5 to 100 mass % based on the solid content calculated as $SiO_2$ (100 mass %) of the silica precursor (A). When the proportion of the silane compound (A1) and its hydrolyzed condensate is at least the lower limit value in the above range, cracking or peeling of the antiglare film can be sufficiently suppressed even if the film thickness is thick.

The content of the liquid medium of the coating composition (B) is an amount to meet the solid content concentration of the coating composition.

The solid content concentration of the coating composition is preferably from 1 to 8 mass %, more preferably from 2 to 6 mass %, in the total amount (100 mass %) of the coating composition. When the solid content concentration is at least the lower limit value in the above range, it is possible to reduce the amount of liquid in the coating composition. When the solid content concentration is at most the upper limit value in the above range, the uniformity in the film thickness of the antiglare film will be improved.

The solid content concentration of the coating composition is the total content of all components other than the liquid medium (B) in the coating composition. Here, the content of the silica precursor (A) is calculated as $SiO_2$.

The content of the liquid medium (B1) having a boiling point of at most 150° C. in the coating composition is at least 86 mass % based on the total amount of the liquid medium (B). By incorporating the liquid medium (B1) in a proportion of at least 86 mass %, it is possible to form an antiglare film having more favorable performance, when the coating composition is applied on a substrate by using an electrostatic painting apparatus having an electrostatic spray gun having a rotary atomizing head, followed by firing. If the proportion of the liquid medium (B1) is less than 86 mass %, flattening and smoothing tend to proceed before solvent volatilization and drying, whereby the film after firing may not become an antiglare film.

The content of the liquid medium (B1) is preferably at least 90 mass % based on the total amount of the liquid medium (B). The content of the liquid medium (B1) may be even 100 mass % based on the total amount of the liquid medium (B).

In a case where the coating composition contains particles (C), the content of the particles (C) is preferably from 3 to 40 mass %, more preferably from 5 to 30 mass % in the solid content (100 mass %) in the coating composition (provided that the silica precursor (A) is calculated as $SiO_2$). When the content of the particles (C) is at least the lower limit value in the above range, the haze of the antiglare film-coated substrate will be sufficiently high, and the 60° specular gloss at the surface of the antiglare film will be sufficiently low, whereby the antiglare effect will be sufficiently exhibited. When the content of the particles (C) is at most the upper limit value in the above range, sufficient abrasion strength will be obtained.

In a case where the coating composition contains particles (C), and the particles (C) contain scaly particles (C1), the content of the scaly particles (C1) is preferably at least 20 mass %, more preferably at least 30 mass %, in the total amount (100 mass %) of the particles (C). The upper limit is not particularly limited and may be 100 mass %. When the proportion of the scaly particles (C1) is at least the above lower limit value, the antiglare effect will be better. Further, it is thereby possible to sufficiently prevent cracking or peeling of the antiglare film even if the film thickness is thick.

The coating composition may be prepared, for example, by preparing a solution having the silane precursor (A) dissolved in the liquid medium (B), and, as the case requires, mixing an additional liquid medium (B), a dispersion of particles (C), etc.

In a case where the particles (C) contain scaly particles (C1), and the silica precursor (A) contains a hydrolyzed condensate of a tetraalkoxysilane, it is preferred to mix a solution of a tetraalkoxysilane, or a solution of a mixture of a tetraalkoxysilane and its hydrolyzed condensate, and a dispersion of the scaly particles (C1), and then hydrolyzing and condensing the tetraalkoxysilane in the presence of the scaly particles (C1), from such a viewpoint that an antiglare film having the desired performance can be thereby produced with good reproducibility at a high level.

[Coating Step]

The application of the coating composition on a substrate is conducted by electrically charging and spraying the above coating composition by using an electrostatic coating apparatus having an electrostatic spray gun having a rotary atomizing head. Thereby a coating film of the above coating composition will be formed on the substrate.

(Electrostatic Coating Apparatus)

Figure 2:
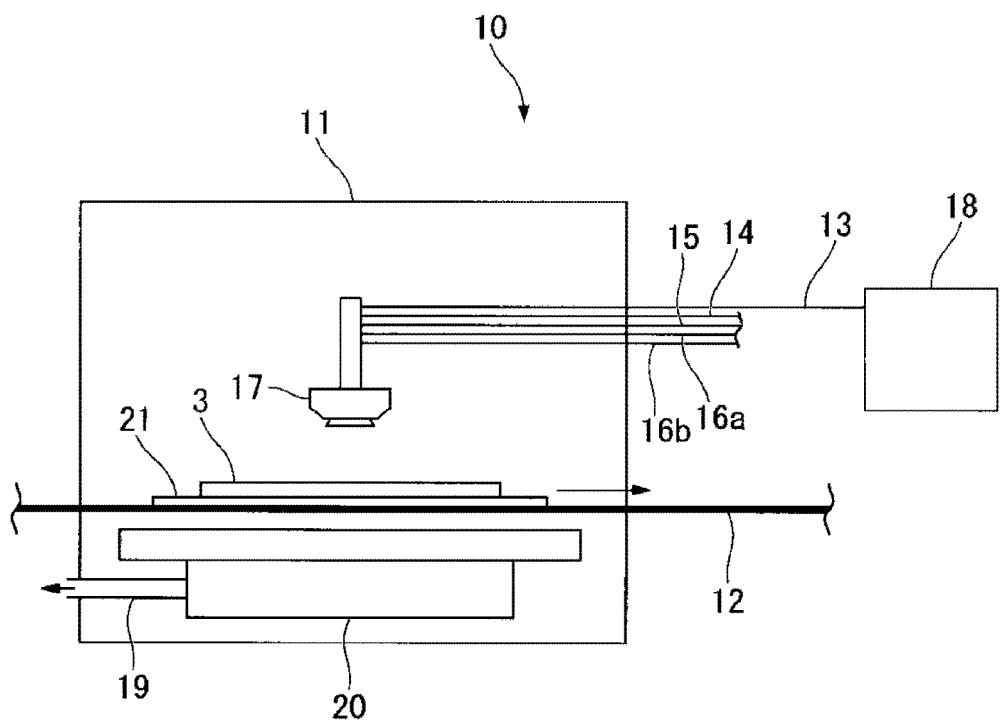
FIG. 2 is a schematic view illustrating an example of the electrostatic coating apparatus.

FIG. 2 is a schematic view illustrating an example of the electrostatic coating apparatus.

The electrostatic coating apparatus 10 comprises a coating booth 11, a chain conveyor 12, a plurality of electrostatic spray guns 17, a high voltage generator 18 and an exhaust box 20.

The chain conveyor 12 passes through the coating booth 11 and is adapted to carry a conductive substrate 21 and a substrate 3 placed thereon, in a predetermined direction.

The plurality of electrostatic spray guns 17 are arranged side by side in a direction crossing the conveying direction of the substrate 3, in the coating booth 11, above the chain conveyor 12, and a high voltage cable 13, a supply line 14 for the coating composition, a recovery line 15 for the coating composition, and two system air supply lines 16a, 16b, are connected to each of them.

The high voltage generator 18 is connected to the electrostatic spray guns 17 via the high voltage cable 13 and is grounded.

The exhaust box 20 is disposed below the electrostatic spray gun 17 and the chain conveyor 12, and an exhaust duct 19 is connected thereto.

An electrostatic spray gun 17 is fixed to a nozzle set frame (not shown). It is so designed that by the nozzle set frame, it is possible to adjust the distance from the nozzle tip of the electrostatic spray gun 17 to the substrate 3, the angle of the electrostatic spray gun 17 to the substrate 3, the direction in which the plurality of electrostatic spray guns 17 are arranged relative to the conveying direction of the substrate 3, etc.

Since a high voltage is applied to the nozzle tip of the electrostatic spray gun 17 and to the feed line 14 and recovery line 15 for the coating composition, connection portions between the electrostatic spray gun 17, the feed line 14 and the recovery line 15, and the portions made of metal (e.g. metal portions of e.g. the nozzle set frame and the side wall passing through portions of the coating booth 11), are insulated with a resin or the like.

The chain conveyor 12 is composed of a plurality of plastic chains, and some of the plurality of plastic chains are conductive plastic chains. Each conductive plastic chain is grounded via a metal chain (not shown) for fitting the plastic chain and a grounding cable (not shown) for its driving motor (not shown).

The conductive substrate 21 is used to ground the substrate 3 mounted thereon, sufficiently via the conductive plastic chains of the chain conveyor 12 and the metal chains and the grounding cables for the driving motors. As the substrate 3 is sufficiently grounded, the coating composition will be uniformly deposited on the substrate 3.

The conductive substrate 21 is preferably a metal mesh tray, since it is thereby possible to prevent a temperature drop of the substrate 3 and to make the temperature distribution uniform.

(Electrostatic Spray Gun)

Figure 3:
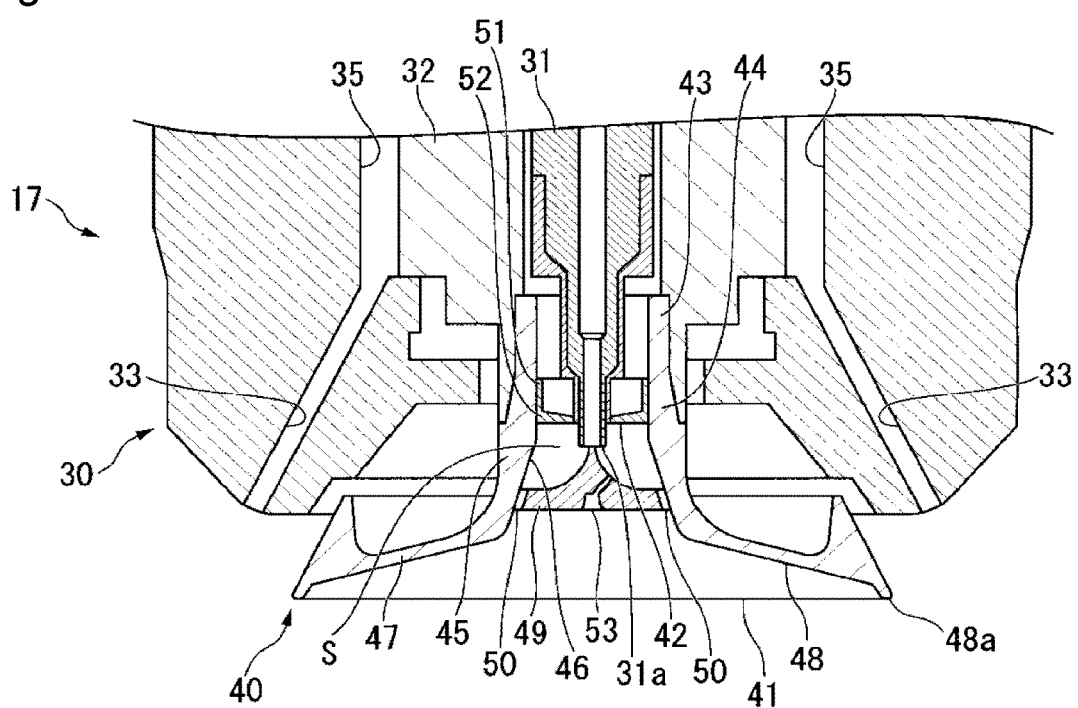
FIG. 3 is a schematic cross-sectional view of an electrostatic spray gun 17 provided on the electrostatic coating apparatus.
Figure 4:
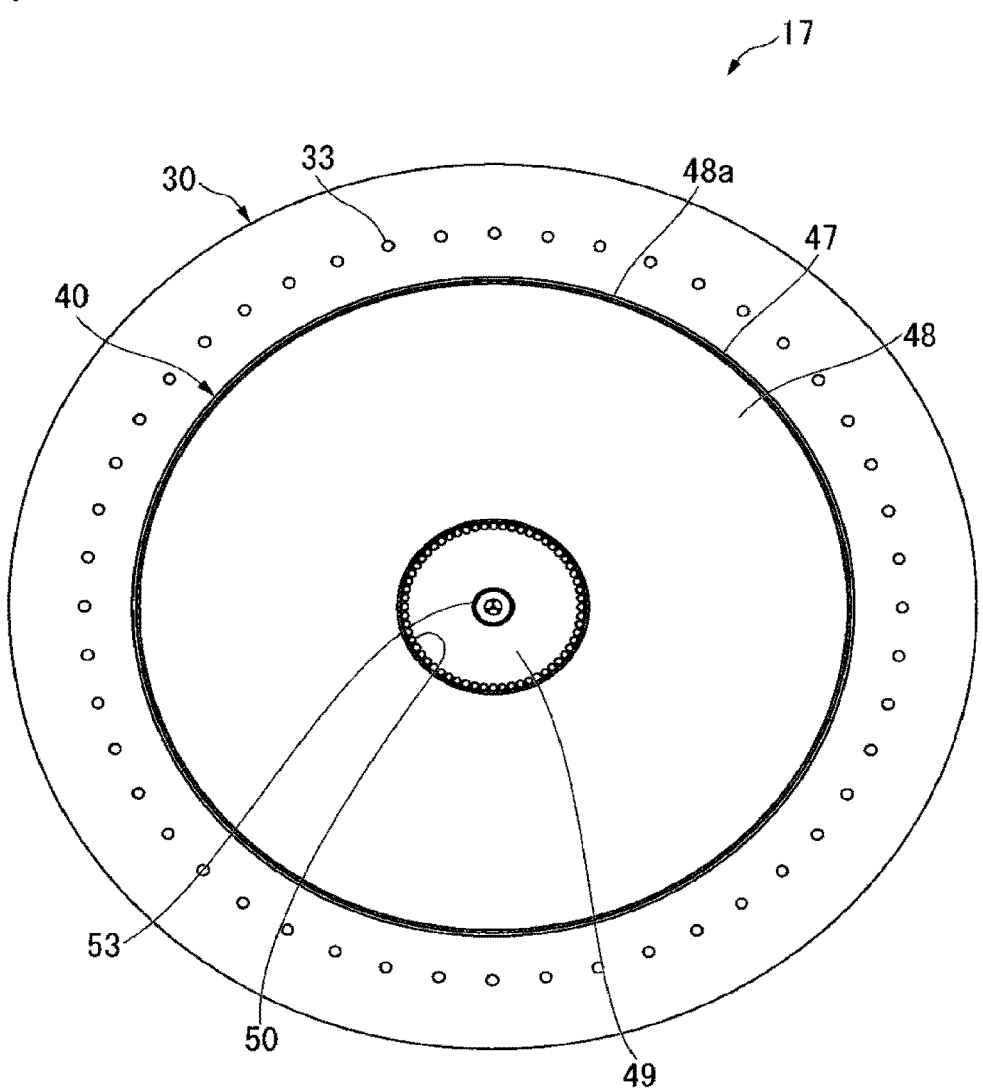
FIG. 4 is a schematic front view showing the electrostatic spray gun 17 as viewed from the front.

FIG. 3 is a cross-sectional schematic view of the electrostatic spray gun 17. FIG. 4 is a schematic front view of the electrostatic spray gun 17 as viewed from the front.

The electrostatic spray gun 17 comprises a gun body 30 and a rotary atomizing head 40. The rotary atomizing head 40 is disposed at the front end of the gun body 30, with its axis directed in an anteroposterior direction.

The electrostatic spray gun 17 is so designed that by rotationally driving the rotary atomizing head 40, the coating composition supplied to the rotary atomizing head 40 is atomized and discharged (i.e. sprayed) by the centrifugal force.

In the description of the electrostatic spray gun 17, the "front" in the front direction, the front end, etc., indicates the spraying direction of the coating composition, and the opposite direction is the back direction. In FIGS. 2 and 3, the downward direction is the front direction in the electrostatic spray gun 17.

In the gun body 30, a coating composition supply pipe 31 is accommodated and fixed coaxially with the rotary atomizing head 40.

In the gun body 30, an air turbine motor (not shown) is provided, and a rotary shaft 32 is provided in the air turbine motor. Further, to the air turbine motor, one system (for example, a supply line 16a) among two system air supply lines 16a, 16b is connected and is adapted so that it is possible to control the rotational speed of the rotary shaft 32 by the air pressure from the supply line 16a. The rotary shaft 32 is disposed coaxially with the rotary atomizing head 40, so as to surround the coating composition supply pipe 31.

Here, an example of using an air turbine motor as a rotation driving means for the rotary shaft 32 is shown, but a rotation driving means other than the air turbine motor may be used.

In the gun body 30, a plurality of air outlets 33 for shaving air (referred to also as shaping air) are formed, and air supply paths 35 for supplying shaving air to the respective plurality of air outlets 33 are formed. Further, to the air supply paths 35, one system (for example, a supply line 16b) among two system air supply lines 16a, 16b is connected so that the air (shaving air) can be supplied to the outlets 33 through the air supply paths 35.

The plurality of air outlets 33 are formed so as to open at equal intervals on a concentric circle around the axis at the center, in a front view of the electrostatic spray gun 17. Further, the plurality of air outlets 33 are formed so as to gradually depart from axial center towards the front of the electrostatic spray gun 17, in a side view of the electrostatic spray gun 17.

The rotary atomizing head 40 comprises a first member 41 and a second member 42. The first member 41 and the second member 42 are each cylindrical.

The first member 41 is one wherein a shaft mounting portion 43, a holding portion 44 in a form extending forwardly from the shaft mounting portion 43, a peripheral wall 45 in a form extending forwardly from the holding portion 44, an enlarged diameter portion 47 in a form extending forwardly from the peripheral wall 45, and a front wall 49 in a form partitioning the center hole of the first member 41 into front and back at the boundary position between the peripheral wall 45 and the enlarged diameter portion 47, are integrally formed.

The holding portion 44 is to hold the second member 42 coaxially to the first member 41.

The inner peripheral surface of the peripheral wall 45 constitutes a tapered guide surface 46 that progressively increases in diameter towards the front over the entire region in the axial direction of the rotary atomizing head 40.

The enlarged diameter portion 47 is in a form diametrically enlarging towards the front in a cup shape, and the front surface of the enlarged diameter portion 47 constitutes a diffusion surface 48 in a form diametrically enlarging gradually towards the front.

Along the outer peripheral edge 48a of the diffusing surface 48 of the enlarged diameter portion 47, over the entire circumference, many fine cuts for atomization of the coating composition are provided at substantially equal intervals.

In the front wall 49, outflow holes 50 are formed in a form extending through the outer peripheral edge of the front wall 49 back and forth. The outflow holes 50 are circular, and a plurality of them are formed at equal angular pitches in the circumferential direction. Further, extending through directions of the outflow holes 50 are parallel to the inclination direction of the guide surface 46 of the peripheral wall 45.

The central portion of the rear surface of the front wall 49 has a conical shape projecting rearward. Further, in this central portion, a through hole 53 is formed which extends from the center of the front surface of the front wall 49 towards the rear and is branched at the middle into three which open on the peripheral surface of the conical portion.

The second member 42 is one wherein a cylindrical portion 51 and a rear wall 52 are integrally formed. The rear wall 52 is disposed at the front end of the cylindrical portion 51. At the center of the rear wall 52, a circular through-hole is formed, so that the front portion of the coating material supply tube 31 can be inserted.

In the rotary atomizing head 40, a space which is surrounded by the front wall 49, the peripheral wall 45 and the rear wall 52, is made to be a storage chamber S. The storage chamber S communicates with the diffusing surface 48 via a plurality of outflow holes 50.

In the electrostatic spray gun 17, the front end portion of the coating composition supply tube 31 is inserted into the through hole at the center of the rear wall 52, so that the discharge port 31a at the front end of the coating composition supply pipe 31 is open in the storage chamber S. Thus, it is so designed that the coating composition can be supplied to the storage chamber S via the coating composition supply tube 31.

Here, the electrostatic coating apparatus and the electrostatic spray gun are not limited to the illustrated examples. As the electrostatic coating apparatus, so long as it has an electrostatic spray gun having a rotary atomizing head, a known electrostatic coating apparatus may be employed. As the electrostatic spray gun, a known electrostatic spray gun may be used so long as it is provided with a rotary atomizing head.

(Application Method)

In the electrostatic coating apparatus 10, the coating composition is applied on the substrate 3, as follows.

The substrate 3 is placed on the conductive substrate 21. Further, by the high voltage generator 18, a high voltage is applied to the electrostatic spray gun 17. At the same time, the coating composition is supplied to the electrostatic spray gun 17 from the supply line 14 for the coating composition, and air is supplied to the electrostatic spray gun 17 from each of the two system air supply lines 16a and 16b.

Air supplied from the air supply line 16b is supplied to the air supply path 35 in the gun body 30 and then blown out as shaving air from the opening of the air outlet 33.

Air supplied from the air supply line 16a drives the air turbine motor in the gun body 30 to rotate the rotary shaft 32. Thus, the coating composition supplied into the storage chamber S via the coating composition supply tube 31 from the supply line 14 of the coating composition, is moved forward along the guide surface 46 of the peripheral wall 45 by a centrifugal force, passes through the outflow holes 50 and is supplied to the diffusing surface 48. A part of the coating composition may be supplied to the diffusing surface 48 via the through hole 53 in the central portion. Here, the guide surface 46 of the peripheral wall 45 has a tapered shape that increases in diameter towards the outlet holes 50, whereby the coating composition in the storage chamber S will certainly reach the outlet holes 50 by centrifugal force, without remaining in the storage chamber S.

Then, the coating composition supplied to the diffusion surface 48, while being diffused along the diffusion surface 48 by centrifugal force, is moved to the outer edge 48a side, forming a liquid film of the coating composition on the diffusing surface 48, and at the outer peripheral edge 48a of the diffusing surface 48 of the enlarged diameter portion 47, it is atomized to become droplets and radially scattered.

Droplets of the coating composition scattered from the rotary atomizing head 40 are guided to the substrate 3 direction by the flow of the shaving air. Further, the droplets are charged with negative charge, and thus, they are attracted by the electrostatic attraction towards the substrate 3 which is grounded. Therefore, they will efficiently deposit on the surface of the substrate 3.

A part of the coating composition not sprayed from the electrostatic spray gun 17 is recovered through the recovery line 15 for the coating composition in a coating composition tank (not shown). Further, a part of the coating composition sprayed from the electrostatic spray gun 17 but did not deposit on the substrate 3, is sucked into the exhaust box 20 and recovered through the exhaust duct 19.

The surface temperature of the substrate 3 is preferably from 15 to 50° C., more preferably from 20 to 40° C. When the surface temperature of the substrate 3 is at least the lower limit value in the above range, the liquid medium of the coating composition (B) quickly evaporates, whereby sufficient irregularities tend to be formed. When the surface temperature of the substrate 3 is at most the upper limit value in the above range, adhesion between the substrate 3 and the antiglare film 5 becomes good.

The transport speed of the substrate 3 is preferably from 0.6 to 20.0 m/min, more preferably from 1.5 to 15.0 m/min. When the transport speed of the substrate 3 is at least 0.6 m/min, the productivity will be improved. When the transport speed of the substrate 3 is at most 20.0 m/min, it is easy to control the thickness of the coating composition to be applied on the substrate 3.

The number of times for transporting the substrate 3, i.e. the number of times for applying the coating composition to the substrate 3 by letting the substrate pass under the electrostatic spray gun 17, may be suitably set according to the desired haze, gloss, etc. From the viewpoint of the antiglare properties, at least once is preferred, and at least twice is more preferred. From the viewpoint of the productivity, at most 6 times is preferred, and at most 5 times is more preferred.

The distance from the nozzle tip of the electrostatic spray gun 17 (i.e. the front end of the rotary atomizing head 40 in the spraying direction of the coating composition) to the substrate 3, is suitably adjusted according to e.g. the width of the substrate 3, the thickness of the coating composition to be applied on the substrate 3, etc., and usually it is form 150 to 450 mm. When the distance to the substrate 3 is shortened, the coating efficiency increases, but if shortened too much, the possibility of causing discharge will increase, thereby leading to a safety problem. On the other hand, when the distance to the substrate 3 is increased, the application area will expand, but if increased too much, lowering of the coating efficiency becomes a problem.

The voltage to be applied to the electrostatic spray gun 17 is suitably adjusted according to the coating amount of the coating composition to be applied on the substrate 3, etc. and is usually in a range of −30 kV to −90 kV. As the absolute value of the voltage becomes large, the coating efficiency tends to increase. Here, when the applied voltage increases to a certain level, the coating efficiency reaches saturation, although such may depend also on e.g. the liquid properties, application environment and application conditions.

The supply amount of the coating composition to the electrostatic spray gun 17 (hereinafter referred to also as the coating liquid amount) is suitably adjusted depending on the coating amount of the coating composition to be applied on the substrate 3, and it is usually from 30 to 200 mL/min. If the coating liquid amount is too small, film breakage may occur. The maximum coating solution amount can optimally be selected depending upon e.g. the coating thickness, coating speed, liquid properties, etc.

The pressure of air to be supplied to the electrostatic spray gun 17 from each of two system air supply lines 16a, 16b, is suitably adjusted depending on the coating amount of the coating composition to be applied on the substrate 3, etc., and it is usually from 0.01 MPa to 0.5 MPa.

It is possible to control the coating pattern of the coating composition by the pressure of air to be supplied to the electrostatic spray gun 17 from each of the two system air supply lines 16a, 16b.

The coating pattern of the coating composition is meant for a pattern formed on a substrate by droplets of the coating composition sprayed from the electrostatic spray gun 17.

As the air pressure of the air to be supplied to the air turbine motor in the electrostatic spray gun 17 is made high, the rotational speed of the rotary shaft 32 increases, and the rotational speed of the rotary atomizing head 40 is raised, whereby the size of the droplets to be scattered from the rotary atomizing head 40 decreases, and the coating pattern tends to be large.

If the air pressure of the air to be supplied to the air supply path 35 in the electrostatic spray gun 17 is increased to increase the air pressure of the air (shaving air) blown out from the air outlet 33, spreading of the droplets to be scattered from the rotary atomizing head 40 is suppressed, and the coating pattern tends to be small.

The air pressure of the air to be supplied to the air turbine motor is adjusted to be a pressure whereby the rotational speed of the rotary atomizing head 40 (hereinafter referred to also as a cup rotational speed) will be within a range of preferably from 5000 to 80000 rpm. The cup rotational speed is more preferably from 7000 to 70000 rpm, particularly preferably from 10000 to 50000 rpm. When the cup rotational speed is at least the lower limit value in the above range, the surface irregularities forming ability will be excellent. When the cup rotational speed is at most the upper limit value in the above range, the coating efficiency will be excellent.

The cup rotational speed can be measured by a measuring instrument (not shown) attached to the electrostatic coating apparatus 10.

The air pressure of the air to be supplied to the air supply path 35 is adjusted to be a pressure whereby the air pressure of the shaving air (hereinafter referred to also as the shaving pressure) will be preferably within a range of from 0.01 to 0.3 MPa. The shaving pressure is more preferably from 0.01 to 0.25 MPa, particularly preferably from 0.01 to 0.2 MPa. When the shaving pressure is at least the lower limit value in the above range, improvement in coating efficiency will be excellent due to improvement in the effect for preventing scattering of droplets. When the shaving pressure is at most the upper limit value in the above range, the coating width can be secured.

[Firing Step]

In the firing step, the coating film of the coating composition formed on the substrate in the coating step, is fired to obtain an antiglare film.

The firing may be carried out simultaneously with the coating by heating the substrate during application of the coating composition to the substrate, or may be carried out after applying the coating composition to the substrate, by heating the coating film.

The firing temperature is preferably at least 30° C., and, for example, in a case where the substrate is glass, it is more preferably from 100 to 750° C., further preferably from 150 to 550° C.

Advantageous Effects

In the method for producing an antiglare film-coated substrate of the present invention as described above, it is possible to form an antiglare film by using, as a coating composition to be sprayed by an electrostatic coating gun having a rotary atomizing head, a coating composition comprising at least one of a silica precursor (A) and particles (C), and a liquid medium (B), wherein the liquid medium (B) contains a liquid medium (B1) having a boiling point of at most 150° C. in an amount of at least 86 mass % based on the total amount of the liquid medium (B). This is considered to be such that, after droplets of the coating composition are deposited on a substrate, the liquid medium (B1) is rapidly volatilized, whereby the droplets are less likely to spread on the substrate, and they are formed into a film in such a state that the shape at the time of being deposited is sufficiently maintained (i.e., the whole of the liquid medium (B) is removed, and in a case where a silica precursor (A) is contained, the silica precursor (A) becomes the matrix).

Further, in the method for producing an antiglare film-coated substrate of the present invention, an electrostatic spray gun having a rotary atomizing head is used, whereby the size (e.g. the width) of the coating pattern is large. For example, in the spray method using a two-fluid spray nozzle which used to be commonly employed for formation of an antiglare film, the width of the coating pattern is at a level of 7 mm at the maximum. Whereas, in the case where an electrostatic spray gun having a rotary atomizing head is employed, the width of the coating pattern can be adjusted to be, for example, 350 mm.

Further, droplets of the coating composition sprayed from the electrostatic spray gun have a negative charge, whereby they are attracted by electrostatic attraction towards the substrate that is grounded. Therefore, as compared with the case of spraying without being electrically charged, the droplets tend to be efficiently deposited on the substrate.

Therefore, in the method for producing an antiglare film-coated substrate of the present invention, it is possible to reduce the coating amount of the coating composition or the number of applications required for forming an antiglare film having an optional haze or 60° specular gloss.

Further, when the antiglare performance of the antiglare film-coated substrate obtained by the method for producing an antiglare film-coated substrate of the present invention, is compared with the antiglare performance of the antiglare film-coated substrate to be formed by using a two-fluid spray nozzle, even if the haze and 60° specular gloss are comparable, one to be obtained by the method for producing an antiglare film-coated substrate of the present invention, tends to have higher antiglare performance in that it is capable of better preventing deterioration of visibility by a reflected image to be formed by having external light or indoor lighting, etc. reflected on the display surface.

This is believed to be due to the difference in the irregularities of the antiglare film. That is, according to a study by the present inventors, in the spray method using a two-fluid spray nozzle, liquid droplets are banged on the substrate, whereby droplets will be in the shape of crowns at the time of landing of the coating composition on the substrate. At the same time, the liquid medium will volatilize to form crown-like irregularities. On the other hand, in the case of using an electrostatic spray gun having a rotary atomizing head, liquid droplets will be relatively slowly dropped on the substrate, whereby droplets will be in the shape of domes at the time of landing on the substrate. At the same time, the liquid medium will volatilize to form dome-like irregularities. Formation of such different shapes is considered to have influenced the antiglare performance.

[Applications]

Applications of the antiglare film-coated substrate of the present invention is not particularly limited. Specific examples may, for example, be vehicle transparent parts (headlight covers, side mirrors, front transparent substrates, side transparent substrates, rear transparent substrates, instrument panel surfaces, etc.), meters, building windows, show windows, displays (notebook PC, monitor, LCD, PDP, ELD, CRT, PDA, etc.), LCD color filters, substrates for touch panels, pickup lenses, optical lenses, spectacle lenses, camera parts, video parts, CCD cover substrates, optical fiber end faces, projector components, copier parts, solar cell transparent substrates (cover glass, etc.), mobile phone windows, backlight unit components (a light guide plate, a cold cathode tube, etc.), backlight unit component liquid crystal brightness-improving films (a prism, a semi-transmissive film, etc.), liquid crystal brightness-improving films, organic EL light emitting device components, inorganic EL light emitting device components, phosphor light emitting device components, optical filters, end faces of optical components, illumination lamps, covers for lamination devices, amplified laser light sources, antireflection films, polarizing films, agricultural films, etc.

<Article>

The article of the present invention is provided with the above-described antiglare film-coated substrate.

The article of the present invention may be one consisting of the antiglare film-coated substrate, or may be one provided further with another member other than the antiglare film-coated substrate.

Examples of the article of the present invention may be ones mentioned above as the applications of the antiglare film-coated substrate, or devices provided with any one or more of them.

As the devices, for example, an image display device, an illumination device, a solar cell module, etc. may be mentioned.

The article of the invention is preferably an image display device, from the viewpoint of the optical properties such as the haze, gloss, antiglare performance, etc.

In a case where the article of the present invention is an image display device, the image display device comprises an image display device main body for displaying an image, and the antiglare film-coated substrate of the present invention provided on the viewing side of the image display device main body.

The image display device main body may, for example, be a liquid crystal panel, an organic EL (electroluminescence) panel, a plasma display panel, etc.

The antiglare film-coated substrate, may be integrally provided on the image display apparatus main body, as a protective plate of the image display device main body, or may be disposed on the viewing side of the image display device main body, as a filter of various types.

In the image display device as described above, the visibility is good, since the antiglare film-coated substrate of the present invention having excellent antiglare performance is provided on the viewing side of the image display device main body.

<Production Method (P) of Scaly Silica Particles>

The production method (P) comprises a step of acid treatment at a pH of at most 2 of a silica powder containing silica aggregates having scaly silica particles aggregated, a step of alkali treatment of the acid-treated silica powder at a pH of at least 8 to peptize the silica aggregates, and a step of wet disintegrating the alkali-treated silica powder to obtain scaly silica particles.

As the silica aggregates, a so-called layered polysilicic acid and/or its salt may be used. The layered polysilicic acid is a polysilicic acid having a silicate layer structure consisting of $SiO_4$ tetrahedron as basic constituent units. As the layered polysilicic acid and/or its salt, for example, silica-X ($SiO_2$—X), silica-Y ($SiO_2$—Y), kenyaite, magadiite, makatite, airaaito, kanemite, octosilicate, etc. may be mentioned. Silica-X or silica-Y is preferred.

Silica-X and silica-Y have a weak crystal phase which is an intermediate phase or metastable phase formed in the process of forming cristobalite and quartz (quartz) by hydrothermal treatment of silica raw material and which should be called a quasi-crystalline silica.

Silica-X and silica-Y are different in their X-rays diffraction patterns, but their particle appearances as observed by an electron microscope are very similar, and each of them can be preferably used to obtain scaly silica particles.

The X-ray diffraction spectrum of silica-X is characterized by the main peaks at $2\theta=4.9°$, $26.0°$, and $28.3°$ corresponding to card (hereinafter referred to as ASTM card) number 16-0380 registered in US ASTM (American Society for Testing and Materials).

The X-ray diffraction spectrum of silica-Y is characterized by the main peaks at $2\theta=5.6°$, $25.8°$ and $28.3°$ corresponding to ASTM card number 31-1233.

The X-ray diffraction spectrum of the silica aggregates is preferably one characterized by the main peaks of silica-X and/or silica-Y.

"Forming of Silica Powder"

The method for forming silica powder containing silica aggregates may, for example, be a method of subjecting at least one of silica hydrogel, silica sol and hydrous silicic acid, as starting material, to hydrothermal treatment in the presence of an alkali metal salt. Here, the silica powder is not limited to one formed by this method and includes one formed by any optional method.

Case where starting material is silica hydrogel:

By using silica hydrogel as starting material, it is possible to let silica-X, silica-Y, etc. form as silica aggregates, by a reaction at a lower temperature in a short time and yet in high yield without letting crystals such as quartz, etc. form.

The silica hydrogel is preferably particulate silica hydrogel. The particle shape of the silica hydrogel may be a spherical shape or may be irregular granules. The granulation method of the silica hydrogel may be suitably selected.

The granulation method of the spherical silica hydrogel may, for example, be (i) a method for solidifying silica hydrosol in a liquid medium such as a petroleum into a spherical shape, and (ii) a method wherein an alkali metal silicate aqueous solution and a mineral acid aqueous solution are mixed so that silica sol is formed in a short time and released into a gaseous medium, to let it be gelled in the gas. The method (ii) is preferred. The mineral acid aqueous solution may, for example, be an aqueous sulfuric acid, an aqueous hydrochloric acid solution, an aqueous nitric acid solution, etc.

A specific example of the method (ii) is as follows.

An alkali metal silicate aqueous solution and a mineral acid aqueous solution are introduced from separate inlets into a container equipped with a discharge outlet and instantaneously uniformly mixed, to form a silica sol having a concentration of 130 g/L calculated as $SiO_2$ and a pH of from 7 to 9. The silica sol is discharged from the discharge outlet into a gas medium such as air and allowed to be gelled in the air. The gelled one is dropped into an aging tank filled with water and aged for a few minutes to several ten minutes, and then, an acid is added, followed by washing with water to obtain a spherical silica hydrogel.

The obtainable silica hydrogel is transparent elastic spherical particles having a uniform particle size with an average particle size of from 2 to 10 mm, and it may sometimes contains water in an amount of about four times by mass ratio relative to $SiO_2$. The $SiO_2$ concentration in the silica hydrogel is preferably from 15 to 75 mass %.

Case where starting material is silica sol:

As the silica sol, it is preferred to use a silica sol containing specific amounts of silica and an alkali metal.

As the silica sol, preferably employed is a silica sol obtained by subjecting an alkali-metal silicate aqueous solution having a molar ratio ($SiO_2/Me_2O$) of silica (calculated as $SiO_2$) to an alkali metal (calculated as $Me_2O$, where Me is an alkali metal such as Li, Na, K, etc.; the same applies hereinafter) being from 1.0 to 3.4, to dealkalization by e.g. an ion exchange resin method, an electrodialysis method, etc. $SiO_2/Me_2O$ in this silica sol is preferably from 3.5 to 20, more preferably from 4.5 to 18.

As the alkali-metal silicate aqueous solution, one having water glass (i.e. an aqueous sodium silicate solution) suitably diluted with water, is preferred.

The $SiO_2$ concentration in the silica sol is preferably from 2 to 20 mass %, more preferably from 3 to 15 mass %.

The average particle size of silica in the silica sol is preferably from 1 to 100 nm. When the average particle size is at most 100 nm, the stability of the silica sol becomes good.

As the silica sol, particularly preferred is one so-called active silicic acid having an average particle size of from 1 to 20 nm.

Case where starting material is hydrous silicic acid:

In a case where hydrous silicic acid is used as a starting material, it is possible to form a silica powder containing silica aggregates in the same manner as for the silica sol.

Hydrothermal Treatment:

By subjecting at least one among silica sources consisting of silica hydrogel, silica sol and hydrous silicic acid to hydrothermal treatment by heating it in a heating pressure vessel such as an autoclave in the presence of an alkali metal salt, it is possible to form a silica powder containing silica aggregates.

Before charging the silica source to the autoclave for the hydrothermal treatment, purified water such as distilled water, ion-exchanged water, etc., may be further added to have the silica concentration adjusted to a desired range.

In the case of using spherical silica hydrogel, it may be used as it is, or may be pulverized or roughly pulverized to bring the average particle size to be from about 0.1 to 6 mm.

The format of the autoclave is not particularly limited. The autoclave may be one equipped with at least a heating means, a stirring means and preferably a temperature measuring means.

The total $SiO_2$ concentration in the treatment solution in the autoclave is selected in consideration of the stirring efficiency, the crystal growth rate, the yield, etc., and it is usually preferably from 1 to 30 mass %, more preferably from 10 to 20 mass %, on the total charged raw material basis. The total $SiO_2$ concentration in the treatment liquid is meant for the total $SiO_2$ concentration in the system, and is a value obtained by adding, not only $SiO_2$ in the silica source, but also $SiO_2$ to be brought into the system by e.g. sodium silicate, etc. in the case of using sodium silicate, etc. as the alkali metal salt.

In the hydrothermal treatment, by letting an alkali metal salt coexist with the silica source, it is possible to adjust the pH of the treatment solution to the alkaline side, to increase the silica solubility moderately, to increase the crystallization speed based on the so-called Ostwald aging, and thus to accelerate conversion of silica hydrogel to silica-X and/or silica-Y.

The alkali metal salt may, for example, be an alkali metal hydroxide, an alkali metal silicate, an alkali metal carbonate, or a combination thereof. The alkali metal may, for example, be Li, Na, K, etc., or a combination thereof. The pH of the system of the treatment liquid to be subjected to hydrothermal treatment is preferably at least 7, more preferably from 8 to 13, further preferably from 9 to 12.5. The molar ratio ($SiO_2/Me_2O$) of the total $SiO_2$ in the system to the alkali metal (calculated as $Me_2O$) is preferably from 4 to 15, more preferably from 7 to 13.

The hydrothermal treatment of the silica sol or hydrous silicic acid is carried out at a temperature of preferably from 150 to 250° C., more preferably from 170 to 220° C., with a view to increasing the reaction rate and reducing the progress of crystallization. The time for the hydrothermal treatment of the silica sol or hydrous silicic acid, may vary depending on e.g. the temperature of the hydrothermal treatment, or the presence or absence of the addition of seed crystals, but is preferably from 3 to 50 hours, more preferably from 3 to 40 hours, further preferably from 5 to 25 hours.

The hydrothermal treatment of the silica hydrogel is carried out at a temperature of preferably from 150 to 220° C., more preferably from 160 to 200° C., further preferably from 170 to 195° C. The time for the hydrothermal treatment of the silica hydrogel may vary depending on e.g. the temperature of the hydrothermal treatment, or the presence or absence of addition of seed crystals, but is preferably from 3 to 50 hours, more preferably from 5 to 40 hours, further preferably from 5 to 25 hours, particularly preferably from 5 to 12 hours.

In order to facilitate the hydrothermal treatment efficiently to shorten the treating time, it is preferred to add seed crystals in an amount of from about 0.001 to 1 mass % (calculated as $SiO_2$) to the charged amount of the silica source (calculated as $SiO_2$). As the seed crystals, it is possible to use silica-X, silica-Y, etc. as it is, or as suitably pulverized.

After completion of the hydrothermal treatment, the product is taken out from the autoclave, filtered and washed with water. Particles after washing treatment with water are preferably such that the pH when made into a 10 mass % water slurry is from 5 to 9, more preferably from 6 to 8.

"Silica Powder"

The average particle size of the obtainable silica powder is preferably from 7 to 25 μm, more preferably from 7 to 11 μm.

In the silica powder, silica aggregates having scaly silica particles aggregated are contained. Silica aggregates are silica tertiary particles of aggregate shape formed by scaly silica particles overlapped and irregularly agglomerated to have spaces. Silica aggregates can be confirmed by observing the silica powder by means of a scanning electron microscope (hereinafter referred to also as SEM.).

By SEM, thin silica primary particles cannot be identified, and it is possible to identify scaly silica secondary particles to be formed by a plurality of silica primary particles overlapped with their faces oriented parallel to one another. On the other hand, by TEM, it is possible to identify silica primary particles being such very thin particles that an electron beam may be partially transmitted therethrough. Further, it is possible to identify silica secondary particles formed by a plurality of silica primary particles overlapped with their faces oriented parallel to one another. Silica primary particles and silica secondary particles are scaly silica particles.

It is considered difficult to peel off from scaly silica secondary particles thin silica primary particles being their constituents one by one. That is, in the overlapping of layered thin silica primary particles, the binding of adjacent layers is firm as fused and integrated. Thus, scaly silica secondary particles are considered to be difficult to be further pulverized into silica primary particles.

According to the production method (P), silica aggregates can be miniaturized to scaly silica secondary particles, and it is further possible to miniaturize them to thinner silica primary particles.

"Acid Treatment"

The method for acid treatment may, for example, be a method of treating a dispersion containing silica powder (including a slurry dispersion) (hereinafter referred to also as a silica dispersion) by adding an acidic solution thereto so that the pH of the system will be at most 2, followed by stirring as the case requires.

By subjecting silica powder containing silica aggregates to acid treatment at a pH of at most 2, it is possible to facilitate peptization of silica aggregates in alkaline treatment in a later step, and it is possible to suppress formation of amorphous silica particles after the wet disintegration step.

Further, by conducting the acid treatment, it is possible to remove an alkali metal salt contained in the silica powder. In a case where the silica powder is one formed by hydrothermal treatment, an alkali metal salt is added in the hydrothermal treatment.

The pH for the acid treatment may be at most 2, preferably at most 1.9. By preliminarily subjecting them to acid treatment at a low pH, it is possible to facilitate peptization and disintegration of silica aggregates in the later steps of alkali treatment and wet disintegration step.

The acid treatment is preferably conducted at room temperature for at least 8 hours in order to carry out the treatment sufficiently.

As the acidic solution, it is possible to use an aqueous mineral acid such as an aqueous sulfuric acid solution, hydrochloric acid or an aqueous nitric acid solution. The concentration of the mineral acid is preferably from 1 to 37 mass %.

The $SiO_2$ concentration in the silica dispersion is preferably from 5 to 15 mass %. The pH of the silica dispersion is preferably from 10 to 12.

The mixing ratio of the silica dispersion and the acidic solution may be adjusted so that the pH becomes at most 2, and is not particularly limited.

After the acid treatment of the silica dispersion, it is preferred to wash the silica powder. By such washing, it is possible to remove alkali metal salts included during hydrothermal treatment or any products derived therefrom.

The washing method may, for example, be a method of washing with water at the time of filtration or centrifugation separation of the silica dispersion.

Of the silica dispersion after the washing, the solid content concentration may be adjusted by addition of water, or by concentration. In a case where it is recovered as a silica cake, after the washing, it may be made into a silica dispersion by addition of water. The pH of the silica dispersion after the washing is preferably from 4 to 6.

"Aluminate Treatment"

The silica powder after the acid treatment may be subjected to aluminate treatment.

By the aluminate treatment, aluminum (Al) is introduced to the surface of the silica particles in the silica powder, so that the surface can be modified to be negatively charged. With the negatively charged silica powder, it is possible to increase the dispersibility in an acidic medium.

The method for aluminate treatment may, for example, be a method wherein an aqueous solution of an aluminate is added to the silica dispersion and optionally stirred and mixed, followed by heat treatment to introduce Al to the surface of the silica particles.

The mixing is preferably carried out at from 10 to 30° C. for from 0.5 to 2 hours.

The heat treatment is preferably carried out under heating and refluxing conditions, and it is preferably carried out at from 80 to 110° C. for at least 4 hours.

The aluminate may, for example, be sodium aluminate, potassium aluminate, etc. or a combination thereof, and sodium aluminate is preferred.

The molar ratio ($Al_2O_3/SiO_2$) of aluminate (calculated as $Al_2O_3$) to silica powder (calculated as $SiO_2$) is preferably from 0.00040 to 0.00160.

The concentration of the aqueous solution of an aluminate is preferably from 1 to 3 mass %.

The addition amount of the aqueous solution of an aluminate is preferably from 5.8 to 80.0 parts by mass to 100 parts by mass of $SiO_2$ in the silica dispersion.

The $SiO_2$ concentration in the silica dispersion is preferably from 5 to 20 mass %. The pH of the silica dispersion is preferably from 6 to 8.

In the silica dispersion after the aluminate treatment, the solid content concentration may be adjusted by addition of water, or by concentration. The pH of the silica dispersion after the aluminate treatment is preferably from 6 to 8.

"Alkali Treatment"

As the case requires, the silica powder after the acid treatment followed by aluminate treatment, is subjected to alkali treatment at a pH of at least 8 to peptize silica aggregates.

By the alkaline treatment, it is possible to peptize a strong bond of the silica aggregates and to bring them in the form of individual scaly silica particles.

To peptize silica aggregates means to give an electrical charge to the silica aggregates and to disperse individual silica particles in the medium.

By the alkaline treatment, almost the entire amount of silica particles contained in the silica powder may be peptized into individual scaly silica particles, or only part thereof may be peptized and aggregates may remain. Further, silica aggregates contained in the silica dispersion may in their entire portion be peptized into individual scaly silica particles, or only a portion thereof may be peptized and the aggregated portion may remain. The remaining aggregates can be disintegrated into individual scaly silica particles in a later step of the wet disintegration step.

The pH for the alkali treatment may be at least 8, preferably at least 8.5, more preferably at least 9. When the pH for the alkali treatment is at least 8, it is possible to facilitate peptization of silica aggregates contained in the silica powder. Even if silica aggregates remain after the alkali treatment, it is possible to weaken the binding of the scaly silica particles in the silica aggregates, so that in a later step of the wet disintegration step, they can easily be disintegrated into individual scaly silica particles.

The method for the alkali treatment may, for example, be a method for treatment by adding an alkaline solution to the silica dispersion so that the pH becomes at least 8, followed by stirring, as the case requires. In place of the alkaline solution, an alkali metal salt and water may be added separately.

The alkaline treatment is preferably carried out at from 10 to 50° C. for from 1 to 48 hours, more preferably for from 2 to 24 hours.

The alkali metal salt may, for example, be a hydroxide or carbonate of an alkali metal such as lithium (Li), sodium (Na), potassium (K), etc., or a combination thereof.

As the alkaline solution, an aqueous solution containing an alkali metal salt may be used. Further, as the alkaline solution, aqueous ammonia ($NH_4^+OH^-$) may also be used.

The concentration of the alkali metal salt in the silica dispersion (mass of the alkali metal/total mass of water and the alkali metal salt in the silica dispersion×100) is preferably from 0.01 to 28 mass %, more preferably from 0.04 to 5 mass %, further preferably from 0.1 to 2.5 mass %.

The amount of the alkali metal salt is preferably from 0.4 to 2.5 mmol, more preferably from 0.5 to 2 mmol, to 1 g of $SiO_2$ in the silica dispersion.

The $SiO_2$ concentration in the silica dispersion is preferably from 3 to 7 mass %. The pH of the silica dispersion is preferably from 8 to 11.

The mixing ratio of the silica dispersion and the alkaline solution, may be adjusted so that the pH becomes to be at least 8 and is not particularly limited.

The average particle size of the silica powder contained in the silica dispersion after the alkali treatment is preferably from 3 to 10 μm, more preferably from 4 to 8.5 μm.

In the silica dispersion after the alkali treatment, the solid content amount may be adjusted by addition of water or by concentration. The pH of the silica dispersion after the alkali treatment is preferably from 8.0 to 12.5.

"Wet Disintegration"

The alkali-treated silica powder is subjected to wet disintegration to obtain scaly silica particles.

In the alkali-treated silica powder, together with silica aggregates partially remained after the peptization of silica aggregates, amorphous silica particles in a state where silica aggregates are atomized, are contained to some extent. By wet disintegrating this powder, it is possible to further disintegrate the amorphous silica particles, to obtain individual scaly silica particles. By having the alkali treatment conducted beforehand, it is possible to facilitate the disintegration of amorphous silica particles in the wet disintegration. Therefore, it is possible to suppress the amount of amorphous silica particles that remain as not sufficiently disintegrated.

The apparatus for the wet disintegration may, for example, be a wet pulverization apparatus (disintegration apparatus) such as a wet bead mill, a wet ball mill, a thin-film spin high-speed mixer, an impact grinding apparatus (a nanomizer, etc.), etc., of a system mechanically stirring at a high speed by means of disintegration media. In particular, it is preferred to use media beads such as alumina, zirconia, etc. having a diameter of from 0.2 to 1 mm, in the wet bead mill, whereby it is possible to carry out disintegration and dispersion not to pulverize or destroy the basic laminated structure of scaly silica particles as much as possible. The impact grinding apparatus is one wherein into a thin tube of from 80 to 1000 μm, the dispersion containing the powder is put under pressure to let particles in the dispersion collide to one another thereby to disperse them, and it is possible to more finely disintegrate the particles by using the impact grinding apparatus.

The silica powder to be wet-disintegrated is preferably made into a dispersion with purified water such as distilled water, ion-exchanged water, etc., adjusted to a proper concentration, and then supplied to the wet disintegration apparatus.

The $SiO_2$ concentration in the dispersion is preferably from 0.1 to 20 mass %, and in consideration of the disintegration efficiency or the working efficiency due to an increase of viscosity, it is more preferably from 0.1 to 15 mass %.

"Cation Exchange Treatment"

The silica powder after the wet disintegration may be subjected to cation exchange treatment, as the case requires.

By cation exchange treatment, it is possible to remove cations, particularly metal ions, contained in the silica powder The method for the cation exchange treatment may, for example, be a method of treatment by adding a cation exchange resin to the silica dispersion containing the silica powder, followed by stirring, as the case requires. The cation exchange treatment is preferably carried out at from 10 to 50° C. for from 0.5 to 24 hours.

The resin matrix of the cation exchange resin may, for example, be a styrene-type resin such as a styrene-divinyl benzene, a (meth) acrylic acid-type resin, etc.

The cation exchange resin is preferably a hydrogen form (H form) cation exchange resin, and, for example, a cation exchange resin having a sulfonic acid group, a carboxyl group or a phosphoric acid group, may be mentioned. The amount of the cation exchange resin is preferably from 3 to 20 parts by mass, to 100 parts by mass of SiO2 in the silica dispersion.

The $SiO_2$ concentration in the silica dispersion is preferably from 3 to 20 mass %. The pH of the silica dispersion is preferably at most 4.

EXAMPLES

Hereinafter, the present invention will be described in detail with reference to Examples. However, the present invention is by no means limited by the following description.

Among the following Ex. 1 to 14, Ex. 1 to 8 and 10 are Examples of the present invention, and Ex. 9 and 11 to 14 are Comparative Examples.

The evaluation methods and materials used in Ex. are shown below.

<Evaluation Methods>
(Arithmetic Average Roughness Ra, Maximum Height Roughness Rz)

The arithmetic average roughness Ra and the maximum height roughness Rz of the surface of an antiglare film, are, respectively, measured by the methods described in JIS B0601:2001 using a surface roughness meter (SURFCOM (registered trademark) 1500DX, manufactured by Tokyo Seimitsu Co., Ltd.). The standard length lr (cut-off value λc) for the roughness curve was set to be 0.08 mm.

(Haze)

The haze of an antiglare layer-coated substrate was measured by the method stipulated in JIS K7136:2000 using a haze meter (HR-100 model, manufactured by Murakami Color Research Laboratory Co.) substantially at the center of the antiglare layer.

(Gloss)

The 60° specular gloss was measured as the gloss of the surface of the antiglare layer. The 60° specular gloss was measured by the method stipulated in 60° specular gloss of JIS Z8741:1997 using a gloss meter (MULTI GLOSS 268Plus, manufactured by Konica Minolta) substantially at the center of the antiglare layer without erasing a back surface reflection of the antiglare layer-coated substrate.

(Antiglare Performance)

On a table set under a fluorescent lamp, an antiglare layer-coated substrate was placed so that the antiglare layer side faced upward, and the reflection of the fluorescent light on the antiglare layer-coated substrate was visually observed, and the antiglare performance was judged by the following standards.

⊚: The silhouette of the fluorescent lamp is not observed.

○: The silhouette of the fluorescent light is observed only slightly.

Δ: The silhouette of the fluorescent lamp is observed but within an acceptable range.

x: The silhouette of the fluorescent lamp is observed strongly.

x x: The silhouette of the fluorescent lamp is observed very strongly.

<Materials Used>
(Production of Scaly Silica Particle Dispersion (a))

"Formation of Silica Powder"

An aqueous sodium silicate solution ($SiO_2/Na_2O$=3.0 (molar ratio), $SiO_2$ concentration: 21.0 mass %) in an amount of 2000 mL/min and an aqueous sulfuric acid solution (sulfuric acid concentration: 20.0 mass %) were introduced from separate inlets into a container equipped with a discharge outlet and instantaneously uniformly mixed, to form a silica sol. The flow rate ratio of the two solutions was adjusted so that the pH of the silica sol discharged from the discharge outlet into the air would be from 7.5 to 8.0. The silica sol was discharged continuously into the air from the outlet. The silica sol became spherical droplets in the air and gelled in the air during the flight for about one second to draw the parabola. Those gelled were dropped into an aging tank filled with water and aged. After the aging, the pH was adjusted to 6, followed further by washing thoroughly with water to obtain a silica hydrogel. The obtained silica hydrogel was spherical particles, and the average particle size was 6 mm. The mass ratio of water to $SiO_2$ in the silica hydrogel was 4.55 times.

The silica hydrogel was roughly pulverized to an average particle size of 2.5 mm using a double roll crusher. Into an autoclave (provided with anchor type stirring blades) having a capacity of 17 $m^3$, so that the total $SiO_2/Na_2O$ in the system would be 12.0 (molar ratio), 7249 kg of the silica hydrogel ($SiO_2$ concentration: 18 mass %) and 1500 kg of an aqueous solution of sodium silicate ($SiO_2$ concentration: 29.00 mass %, $Na_2O$ concentration: 9.42 mass %, $SiO_2/Na_2O$=3.18 (molar ratio)) were charged, and 1560 kg of water was added thereto, whereupon with stirring at 10 rpm, 4682 kg of high pressure steam under a saturated pressure of 1.67 MPa was added, and the temperature was raised to 185° C., whereby hydrothermal treatment was carried out for 5 hours. The total $SiO_2$ concentration in the system was 12.5 mass %.

The obtained silica dispersion was filtered and washed, whereupon the silica powder was taken out and observed by means of TEM. It was confirmed that silica aggregates were contained in the silica powder. The average particle size of the silica powder was 8.33 m by a laser diffraction/scattering type particle size distribution analyzer (LA-950, manufactured by Horiba Ltd., the same applies hereinafter).

"Acid Treatment"

While stirring 10100 g of the silica dispersion containing silica powder (solid content concentration measured by infrared moisture meter: 13.3 mass %, pH: 11.4) by a stirrer, 1083 g of an aqueous sulfuric acid solution (sulfuric acid concentration: 20 mass %) was added. After the addition, the pH was 1.5. As it was, stirring was continued at room temperature for 18 hours to carry out the treatment.

The silica dispersion after acid treatment was filtered and washed with water of 50 mL per 1 g of $SiO_2$. The silica cake after washing was recovered, and water was added to prepare a slurried silica dispersion. The solid content concentration of the silica dispersion as measured by an infrared moisture meter was 14.7 mass %, and the pH was 4.8.

"Aluminate Treatment"

7000 g of the silica dispersion after the acid treatment was put into a 10 L flask, and while stirring with an overhead stirrer, 197 g of an aqueous sodium aluminate solution (concentration of 2.02 mass %) ($Al_2O_3/SiO_2$=0.00087 (molar ratio)) was added gradually in small portions. After the addition, the pH was 7.2. After the addition, the stirring was continued at room temperature for 1 hour. Thereafter, the temperature was raised, and the treatment was carried out under heating and refluxing conditions for 4 hours.

"Alkali Treatment"

While stirring 775 g of the silica dispersion after the aluminate treatment with a stirrer, 43.5 g (1 mmol/g-silica) of potassium hydroxide and 1381 g of water were added. The pH after the addition, was 9.9. As it was, stirring was continued at room temperature for 24 hours, to carry out the treatment. The average particle size of the silica powder after the alkali treatment was 7.98 μm.

"Wet Disintegration"

The silica dispersion after the alkali treatment was subjected to treatment by 30 path under a discharge pressure of from 130 to 140 MPa by means of an ultra-high pressure wet atomization unit (Nanomizer (registered trademark) NM2-2000AR, manufactured by Yoshida Kikai Co., Ltd., pore size: 120 μm, collision type generator), whereby the silica powder was disintegrated and dispersed. The pH of the silica dispersion after the disintegration was 9.3, and the average particle size measured by a laser diffraction/scattering type particle size distribution measuring device was 0.182 μm.

"Cation Exchange"

161 mL of a cation exchange resin was added to 1550 g of the silica dispersion after the disintegration, and while stirring with an overhead stirrer, treatment was carried out at room temperature for 17 hours. Thereafter, the cation exchange resin was separated. The pH of the silica dispersion after the cation exchange was 3.7.

"Concentration Adjustment"

The silica dispersion after the cation exchange was treated by an ultrafiltration membrane (MOLSEP (registered trademark), manufactured by Daisen Membrane System, cut-off molecular weight: 150,000), to adjust the concentration.

From the obtained silica dispersion (scaly silica particle dispersion (a)), silica particles were taken out and observed by TEM, whereby it was confirmed that they were composed solely of scaly silica particles containing substantially no amorphous silica particles.

The average particle size of the scaly silica particles contained in the scaly silica particle dispersion (a) was the same as after the wet disintegration, i.e. 0.182 μm. The average aspect ratio was 188.

The solid content concentration of the scaly silica particle dispersion (a) measured by an infrared moisture meter was 5.0 mass %.

(Preparation of Base Liquid (b))

While stirring 34.33 g of denatured ethanol (Sol mix (registered trademark) AP-11, manufactured by Japan Alcohol Trading Co., Ltd., a mixed solvent containing ethanol as the main component, boiling point 78° C., the same applies hereinafter), 4.20 g of silicate 40 (a mixture of tetraethoxysilane and its hydrolyzed condensate, manufactured by Tama Chemicals Co., Ltd., solid content concentration (calculated as $SiO_2$): 40 mass %, solvent:ethanol (at most 10%), the same applies hereinafter) and 2.00 g of the scaly silica particle dispersion (a) were added, and the mixture was stirred for 30 minutes. Thereto, 3.55 g of ion-exchanged water and 0.06 g of an aqueous nitric acid solution (nitric acid concentration: 61 mass %) were added and stirred for 60 min, to prepare a base liquid (b) having a the solid content concentration (calculated as $SiO_2$) of 4.0 mass %. Here, the solid content concentration calculated as $SiO_2$ is a solid content concentration where all of Si in silicate 40 is converted to $SiO_2$.

(Preparation of Silane Compound Solution (c))

While stirring 3.85 g of denatured ethanol, a liquid mixture of 0.37 g of ion-exchanged water and 0.01 g of an aqueous nitric acid solution (nitric acid concentration 61 mass %) was added, followed by stirring for 5 minutes. Then, 0.54 g of 1,6-bis (trimethoxysilyl) hexane (KBM-3066, manufactured by Shin-etsu Chemical Industries Co., Ltd., solid content concentration (calculated as $SiO_2$): 37 mass %) was added, followed by stirring in a water bath at 60° C. for 15 minutes, to prepare a silane compound solution (c) having a solid content concentration (calculated as $SiO_2$) of 4.3 mass %.

(Preparation of Coating Solution (d))

While stirring 44.14 g of the base liquid (b), 4.77 g of the silane compound solution (c) was added, followed by stirring for 60 minutes. Thereto, 4.09 g of denatured ethanol was added, followed by stirring for 30 minutes at room temperature, to obtain a coating solution (d) having a solid content concentration (calculated as $SiO_2$) of 4.0 mass %.

(Preparation of Coating Solution (e))

While stirring 44.14 g of the base liquid (b), 4.77 g of the silane compound solution (c) was added, followed by stirring for 60 minutes. Thereto, 54.09 g of denatured ethanol was added, followed by stirring for 30 minutes at room temperature, to obtain a coating solution (e) having a solid content concentration (calculated as $SiO_2$) of 2.0 mass %.

(Preparation of Base Liquid (f))

While stirring 34.33 g of denatured ethanol, 4.76 g of silicate 40 and 2.00 g of scaly silica particle dispersion (a) were added, and the mixture was stirred for 30 minutes. Thereto, a liquid mixture of 3.55 g of ion-exchanged water and 0.06 g of an aqueous nitric acid solution (nitric acid concentration: 61 mass %) was added, followed by stirring at room temperature for 60 minutes, to obtain a base liquid (f) having a solid content concentration (calculated as $SiO_2$) of 4.0 mass %. Here, the solid content concentration calculated as $SiO_2$ is a solid content concentration where all of Si in silicate 40 was converted to $SiO_2$.

(Preparation of Coating Solution (g))

To the base liquid (f), 51.09 g of denatured ethanol was added, followed by stirring at room temperature for 30 minutes, to obtain a coating solution (g) having a solid content concentration (calculated as $SiO_2$) of 2.0 mass %.

(Preparation of Base Liquid (h))

While stirring 34.33 g of denatured ethanol, 4.45 g of silicate 40 was added, followed by stirring for 30 minutes. Thereto, a liquid mixture of 3.55 g of ion-exchanged water and 0.06 g of an aqueous nitric acid solution (nitric acid concentration: 61 mass %) was added, followed by stirring at room temperature for 60 minutes, to obtain a base liquid (h) having a solid content concentration (calculated as $SiO_2$) of 4.0 mass %. Here, the solid content concentration calculated as $SiO_2$ is a solid content concentration where all of Si in the silicate 40 was converted to $SiO_2$.

(Preparation of Coating Solution (i))

To the base liquid (h), 151.09 g of denatured ethanol was added, followed by stirring at room temperature for 30 minutes, to obtain a coating solution (i) having a solid content concentration (calculated as $SiO_2$) of 1.0 mass %.

(Preparation of Coating Solution (j))

To the base liquid (f), 96.09 g of denatured ethanol and 5 g of isobutyl alcohol (boiling point 108° C.) were added, followed by stirring at room temperature for 30 minutes, to obtain a coating solution (j) having a solid content concentration (calculated as $SiO_2$) of 2.0 mass %.

(Preparation of Coating Solution (k))

To the base liquid (f), 96.09 g of denatured ethanol and 5 g of diacetone alcohol (boiling point 166° C.) were added, followed by stirring at room temperature for 30 minutes, to obtain a coating solution (k) having a solid content concentration (calculated as $SiO_2$) of 2.0 mass %.

(Preparation of Coating Solution (l))

To the base liquid (f), 96.09 g of denatured ethanol and 5 g of 1-pentanol (boiling point 138° C.) were added, followed by stirring at room temperature for 30 minutes, to obtain a coating solution (l) having a solid content concentration (calculated as $SiO_2$) of 2.0 mass %.

(Preparation of Coating Solution (m))

To the base fluid (f), 96.09 g of denatured ethanol and 5 g of 1-hexanol (157° C.) were added, followed by stirring at room temperature for 30 minutes, to obtain a coating solution (m) having a solid content concentration (calculated as $SiO_2$) of 2.0 mass %.

(Preparation of Coating Solution (n))

While stirring 72.1 g of denatured ethanol, a liquid mixture of 6.0 g of ion-exchanged water and 1.23 g of 61 mass % nitric acid, was added, followed by stirring for 5 minutes. Thereto, 9.0 g of silicate 40 (solid content concentration calculated as $SiO_2$: 40 mass %) was added, followed by stirring at room temperature for 30 minutes. While stirring 7.2 g of denatured ethanol, 0.7 g of ion-exchanged water, 0.15 g of 61 mass % nitric acid and 1.04 g of 1,6-bis trimethoxysilyl hexane were added thereto, followed by stirring for 5 minutes, and then, a liquid stirred at 60° C. for 15 minutes was added. To this, 2.8 g of ethylene glycol (boiling point 197° C.) was added, followed by stirring at room temperature for 30 minutes, to obtain a coating solution (n) having a solid content concentration calculated as $SiO_2$ of 3.78 mass %. Here, the solid content concentration calculated as $SiO_2$ is a solid content concentration where all of Si in the silicate 40 was converted to $SiO_2$.

(Preparation of Base Liquid (o))

While stirring 34.33 g of denatured ethanol, 4.20 g of silicate 40 and 2.00 g of scaly silica particle dispersion (a) were added, and the mixture was stirred for 30 minutes. Thereto, a liquid mixture of 3.55 g of ion-exchanged water and 0.06 g an aqueous nitric acid solution (nitric acid concentration: 61 mass %) was added and stirred for 60 minutes. Thereto, 0.09 g of porous spherical silica particles (Light Star (registered trademark) LA-S23A, manufactured by Nissan Chemical Industries, Ltd., solid content concentration (calculated as $SiO_2$): 23 mass %, dispersion medium: water) was added, followed by stirring for 15 minutes, to prepare a base liquid (o) having a solid content concentration (calculated as $SiO_2$) of 4.1 mass %. Here, the solid content concentration calculated as $SiO_2$ is a solid content concentration where all of Si in the silicate 40 was converted to $SiO_2$.

(Preparation of Coating Solution (p))

While stirring the base liquid (o), the silane compound solution (c) was added, followed by stirring for 60 minutes. Thereto, 51.09 g of denatured ethanol was added and stirred at room temperature for 30 minutes, to obtain a coating solution (p) having a solid content concentration (calculated as $SiO_2$) of 2.0 mass %.

Ex. 1

(Washing of Substrate)

As the substrate, soda lime glass (FL1.1, manufactured by Asahi Glass Co., Ltd., glass substrate, size: 100 mm×100 mm, thickness: 1.1 mm) was prepared. The surface of the glass was washed with an aqueous sodium hydrogen carbonate solution and then rinsed with ion-exchanged water and dried.

(Electrostatic Coating Apparatus)

An electrostatic coating apparatus (liquid electrostatic coater, manufactured by Asahi Sunac Co.) having the same construction as the electrostatic coating apparatus 10 shown in FIG. 1, was prepared. As an electrostatic spray gun, a rotary atomizing automatic electrostatic gun (Sanberu, ESA120, manufactured by Asahi Sunac Co., 70φ cup) was prepared.

To facilitate grounding of the substrate, a metal mesh tray was prepared as a conductive substrate.

(Electrostatic Coating)

The temperature in the coating booth of the electrostatic coating apparatus was adjusted to be 25±1° C., and the humidity was adjusted to be from 50±10%.

On a chain conveyor of the electrostatic coating apparatus, the washed substrate preheated to 30° C.±3° C. was placed via the conductive substrate. While conveying at a constant speed by the chain conveyor, the coating solution (d) was applied on the top surface of the substrate (the surface on the opposite side of the surface which was in contact with the molten tin during the production by a float process) by an electrostatic coating method under the coating conditions as shown in Table 1, and then fired in the atmospheric air at 450° C. for 30 minutes to obtain an antiglare film-coated substrate.

With respect to the obtained antiglare film-coated substrate, the above-mentioned evaluations were carried out. The results are shown in Table 1.

Ex. 2 to Ex. 11

Antiglare film-coated substrates in Ex. 2 to Ex. 11 were prepared in the same manner as Ex. 1, except that the coating conditions were changed as shown in Table 1. With respect to the obtained antiglare film-coated substrates, the above-mentioned evaluations were carried out. The results are shown in Table 1.

Ex. 12

As a spray robot, a six-axis coating robot (JF-5, manufactured by Kawasaki Robotics Inc.) was used. As a nozzle, a VAU nozzle (two-fluid spray nozzle, manufactured by Spraying Systems Japan) was used.

The coating solution (i) was applied by the spraying pitch and spray pattern as disclosed in FIG. 2 of JP 2009-058640. That is, by setting the air discharge pressure of the VAU nozzle to be 0.4 MPa, the nozzle is moved on the washed substrate (glass substrate 22) in the transverse direction at a speed of 750 mm/min, then moved forward by 22 mm and then from there, moved on the substrate (glass substrate 22) in the transverse direction at a speed of 750 nm/minute speed. Movement of the VAU nozzle is carried out until the entire surface of the washed substrate preheated to 30° C.±3° C. is scanned by the VAU nozzle. One obtained by applying the coating solution on the entire surface of the substrate by the method will be referred to as a one layer-coated article. One obtained by applying the coating solution on the one layer-coated article in the same manner will be referred to as a two layer-coated article. In the same manner, by repeating coating on the two layer-coated article, it is possible to obtain a three or more layer-coated article.

After applying the coating liquid (l) under the coating conditions as shown in Table 2, firing was carried out in the atmospheric air at 450° C. for 30 minutes, to obtain an antiglare film-coated substrate.

With respect to the obtained antiglare film-coated substrate, the above-mentioned evaluations were carried out. The results are shown in Table 2.

Ex. 13 and Ex. 14

Antiglare film-coated substrates in Ex. 13 and Ex. 14 were prepared in the same manner as in Ex. 12, except that the coating conditions were changed as shown in Table 2. With respect to the obtained antiglare film-coated substrates, the above-mentioned evaluations were carried out. The results are shown in Table 2.

TABLE 2-continued

|  | Ex. 12 | Ex. 13 | Ex. 14 |
|---|---|---|---|
| Distance from front end of nozzle to glass plate (mm) | 115 | 115 | 280 |
| Time required for coating (relative value) | 9 | 10 | a35 |
| Haze (%) | 3.0 | 4.5 | 25 |
| Gloss | 96 | 82 | 22 |
| Judgment of antiglare performance | ◯ | ◯ | ◎ |
| Ra (μm) | 0.064 | 0.093 | 0.22 |
| Rz (μm) | 0.42 | 1.2 | 2.7 |

The time required for coating in Tables 1 and 2 is a relative value to the coating time in Ex. 1 (a comparative value when the time required for coating in Ex. 1 is taken as 1).

As shown in the above results, in Ex. 1 to 8 and Ex. 10 wherein the coating compositions (coating solutions d, e, g, i, j and l) having a proportion of a liquid medium with a boiling point of at most 150° C. being at least 86 mass % to the total amount of the liquid medium, were applied by a rotary atomizing type automatic electrostatic gun, it was possible to obtain antiglare film-substrates having sufficient antiglare performance in a short coating time of a relative value of from 0.6 to 4.

On the other hand, in Ex. 9 and Ex. 11 wherein the coating compositions (coating solution k and m) having a proportion of a liquid medium with a boiling point of at most 150° C. being less than 86 mass % to the total amount of the silica precursor and the liquid medium, were applied by a rotary atomizing automatic electrostatic gun, the antiglare performance of the obtained antiglare film-coated substrates was insufficient.

In Ex. 12 to 14, wherein the coating compositions (coating solutions l and n) were applied by a spray coating method, in order to obtain an antiglare film-coated substrate with an antiglare judgment result of ◯ or ◎, the court time of a relative value of from 9 to 35 was required.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Coating solution | d | d | e | g | i | i | i | j | k | l | m |
| Applied voltage (kV) | −60 | −60 | −60 | −60 | −60 | −60 | −60 | −60 | −60 | −60 | −60 |
| Applied amount (mL/min) | 50 | 70 | 100 | 30 | 30 | 30 | 30 | 75 | 75 | 75 | 75 |
| Distance from front end of nozzle to glass plate (mm) | 300 | 300 | 300 | 250 | 250 | 250 | 250 | 250 | 250 | 250 | 250 |
| Shaving pressure (MPa) | 0.04 | 0.04 | 0.04 | 0.04 | 0.04 | 0.04 | 0.04 | 0.04 | 0.04 | 0.04 | 0.04 |
| Cup rotational speed (krpm) | 10 | 10 | 15 | 30 | 30 | 30 | 30 | 10 | 10 | 10 | 10 |
| Substrate transport speed (m/min) | 2 | 2 | 2 | 3 | 2 | 2 | 2 | 1 | 1 | 1 | 1 |
| Number of transporting times of substrate (times) | 1 | 3 | 1 | 1 | 2 | 3 | 4 | 1 | 1 | 1 | 1 |
| Time required for coating (relative value) | 1 | 3 | 1 | 0.6 | 2 | 3 | 4 | 1 | 1 | 1 | 1 |
| Haze (%) | 15 | 43 | 26 | 12 | 2.6 | 4.9 | 11 | 7.7 | 6.4 | 24 | 19 |
| Gloss | 50 | 13 | 26 | 82 | 102 | 82 | 62 | 65 | 98 | 43 | 43 |
| Judgment of antiglare performance | ◎ | ◎ | ◎ | ◯ | ◯ | ◯ | ◯ | ◯ | X X | Δ | X |
| Ra (μm) | 0.28 | 0.63 | 0.28 | 0.16 | 0.074 | 0.11 | 0.14 | 0.12 | 0.04 | 0.12 | 0.11 |
| Rz (μm) | 1.9 | 4.8 | 2.3 | 1.9 | 0.42 | 0.97 | 1.3 | 0.92 | 0.31 | 0.88 | 0.90 |

TABLE 2

|  | Ex. 12 | Ex. 13 | Ex. 14 |
|---|---|---|---|
| Coating solution | l | l | n |
| Number of coated layers | 6 | 8 | 21 |
| Applied amount (mL/min) | 7 | 7 | 28 |
| Temperature of substrate surface (° C.) | 80 | 80 | 90 |

INDUSTRIAL APPLICABILITY

According to the present invention, it is possible to provide a method for producing an antiglare film-coated substrate having excellent antiglare performance in a short time, an antiglare film-coated substrate having excellent antiglare performance, and an article provided therewith.

This application is a continuation of PCT Application No. PCT/JP2015/065802, filed on Jun. 1, 2015, which is based upon and claims the benefit of priority from Japanese Patent Application No. 2014-114399 filed on Jun. 2, 2014. The contents of those applications are incorporated herein by reference in their entireties.

REFERENCE SYMBOLS

| | |
|---|---|
| 1: antiglare film-coated substrate | 3: substrate |
| 5: antiglare film | 10: electrostatic coating apparatus |
| 11: coating booth | 12: chain conveyor |
| 13: high-voltage cable | 14: supply line for coating composition |
| 15: recovery line for coating composition | 16: air supply line |
| 17: electrostatic spray gun | 18: high-voltage generator |
| 19: exhaust duct | 20: exhaust box |
| 21: conductive substrate | 30: gun body |
| 31: coating composition supply tube | 32: rotating shaft |
| 33: discharge outlet | 35: air supply channel |
| 40: rotary atomizing head | 41: first member |
| 42: second member | 43: axis attaching portion |
| 44: holding section | 45: peripheral wall |
| 46: induction surface | 47: large-diameter portion |
| 48: diffusing surface | 49: front wall |
| 50: outflow holes | 51: cylindrical portion |
| 52: back wall | 53: through-hole |
| S: storage chamber | |

What is claimed is:

1. A method for producing an antiglare film-coated substrate comprising a substrate and an antiglare film formed on said substrate, the method comprising:
   preparing a coating composition comprising a silica precursor (A) and particles (C), and a liquid medium (B), wherein the liquid medium (B) comprises a liquid medium (B1) having a boiling point of at most 150° C. in an amount of at least 86 mass % based on the total amount of the liquid medium (B),
   electrically charging and spraying the coating composition by using an electrostatic coating apparatus having an electrostatic spray gun having a rotary atomizing head, to apply the coating composition on the substrate, when a surface temperature of the substrate is in a range of from 15 to 50° C., to form a coating film, and
   firing the coating film to form an antiglare film,
   wherein the liquid medium (B) is a mixture of the liquid medium (B1) and another liquid medium which is an alcohol, a ketone, an ether, a cellosolve, an ester, a glycol ether, a nitrogen-containing compound and/or a sulfur-containing compound, and which has a boiling point exceeding 150° C., and
   wherein the particles (C) are scaly silica particles.

2. The method of claim 1, wherein a rotational speed of the rotary atomizing head at the time of applying the coating composition is in a range of from 5000 to 80000 rpm.

3. The method of claim 1, wherein at the time of applying the coating composition, shaving air is blown under an air pressure of from 0.01 to 0.3 MPa from the electrostatic spray gun.

4. The method of claim 1, wherein the total content of the silica precursor (A) and the particles (C) in the coating composition is from 30 to 100 mass %, based on 100 mass % of the solid content in the coating composition and provided that the silica precursor (A) is calculated as $SiO_2$.

5. The method of claim 1, wherein the content of the silica precursor (A) in the coating composition (A) is from 35 to 95 mass %, based on 100 mass % of the solid content in the coating composition and provided that the silica precursor (A) is calculated as $SiO_2$.

6. The method of claim 1, wherein the content of the particles (C) in the coating composition is from 3 to 40 mass %, based on 100 mass % of the solid content in the coating composition and provided that the silica precursor (A) is calculated as $SiO_2$.

7. The method of claim 1, wherein the content of the liquid medium (B) in the coating composition is such an amount that the solid content concentration of the coating composition is from 1 to 8 mass %, based on 100 mass % of the coating composition.

8. The method of claim 1, wherein the electrical charging and spraying is at room temperature and at a humidity of 50±10%.

9. The method of claim 1, wherein an arithmetic average roughness Ra of a surface of the antiglare film is from 0.10 to 0.70 μm.

10. The method of claim 1, wherein an arithmetic average roughness Ra of a surface of the antiglare film is from 0.15 to 0.50 μm.

11. The method of claim 1, wherein the scaly silica particles (C) have an average particle size of from 0.08 to 0.42 μm.

12. The method of claim 1, wherein the scaly silica particles (C) have an average particle size of from 0.08 to 0.42 μm, and
   wherein an arithmetic average roughness Ra of a surface of the antiglare film is from 0.10 to 0.70 μm.

* * * * *